(12) United States Patent
Terashima et al.

(10) Patent No.: US 10,733,900 B2
(45) Date of Patent: Aug. 4, 2020

(54) TUNING ESTIMATING APPARATUS, EVALUATING APPARATUS, AND DATA PROCESSING APPARATUS

(71) Applicant: YAMAHA CORPORATION, Shizuoka (JP)

(72) Inventors: Tatsuya Terashima, Shizuoka (JP); Shuichi Matsumoto, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 155 days.

(21) Appl. No.: 15/774,885

(22) PCT Filed: Oct. 27, 2016

(86) PCT No.: PCT/JP2016/081810
§ 371 (c)(1),
(2) Date: May 9, 2018

(87) PCT Pub. No.: WO2017/082061
PCT Pub. Date: May 18, 2017

(65) Prior Publication Data
US 2018/0357920 A1 Dec. 13, 2018

(30) Foreign Application Priority Data
Nov. 10, 2015 (JP) ................. 2015-220445

(51) Int. Cl.
*G09B 15/00* (2006.01)
*G10L 25/90* (2013.01)
(Continued)

(52) U.S. Cl.
CPC .............. *G09B 15/00* (2013.01); *G10G 7/02* (2013.01); *G10H 1/366* (2013.01); *G10H 1/44* (2013.01);
(Continued)

(58) Field of Classification Search
CPC .......... G09B 15/00; G10G 7/02; G10H 1/366; G10H 1/44; G10L 25/90
(Continued)

(56) References Cited

U.S. PATENT DOCUMENTS 5,056,398 A * 10/1991 Adamson ................. G10G 7/02
84/454
6,580,024 B2 * 6/2003 Skubic .................... G01H 13/00
84/454

(Continued)

FOREIGN PATENT DOCUMENTS

JP    1994-295192 A    10/1994
JP    06-308946 A      11/1994
(Continued)

OTHER PUBLICATIONS

Office Action received for Japanese Patent application No. 2015-220445, dated Sep. 10, 2019, 2 pages of office action and 4 pages of English translation.
(Continued)

*Primary Examiner* — David S Warren
*Assistant Examiner* — Christina M Schreiber
(74) *Attorney, Agent, or Firm* — Chip Law Group

(57) ABSTRACT

Tuning information is calculated based on input sounds. A tuning estimating apparatus includes an input sound acquirer for acquiring input sounds, a pitch calculator for calculating pitches of the input sounds acquired by the input sound acquirer, and a tuning value calculator for calculating a tuning value representing an offset between a tuning reference position serving as a reference for tuning and a reference position on a first distribution of the pitches calculated by the pitch calculator, based on a peak of the first distribution. The tuning value calculator calculates the tuning
(Continued)

value based on the positional relationship of a periodic peak group of the first distribution.

9 Claims, 18 Drawing Sheets

(51) Int. Cl.
| | | |
|---|---|---|
| *G10G 7/02* | (2006.01) | |
| *G10H 1/36* | (2006.01) | |
| *G10H 1/44* | (2006.01) | |
| *G10K 15/02* | (2006.01) | |

(52) U.S. Cl.
CPC ........ *G10L 25/90* (2013.01); *G10H 2210/066* (2013.01); *G10H 2210/091* (2013.01); *G10H 2210/331* (2013.01); *G10K 15/02* (2013.01)

(58) Field of Classification Search
USPC .......................................................... 84/454
See application file for complete search history.

(56) References Cited

U.S. PATENT DOCUMENTS

| | | | | |
|---|---|---|---|---|
| 7,446,248 B2* | 11/2008 | Skinn | ........................ | G10G 7/02 84/312 R |
| 7,514,620 B2* | 4/2009 | Friedman | .................. | G10H 1/44 84/454 |
| 2004/0060423 A1* | 4/2004 | Clynes | ..................... | G10H 1/44 84/609 |
| 2007/0169612 A1* | 7/2007 | Miyazawa | ................ | G10H 1/06 84/423 R |
| 2008/0072739 A1* | 3/2008 | Ueno | ........................ | G10G 7/02 84/454 |
| 2011/0179939 A1* | 7/2011 | Ribner | .................... | G01H 13/00 84/454 |
| 2018/0277069 A1* | 9/2018 | Jalgha | ........................ | G10D 3/14 |
| 2018/0357920 A1* | 12/2018 | Terashima | ................ | G10G 7/02 |

FOREIGN PATENT DOCUMENTS

| | | | | | |
|---|---|---|---|---|---|
| JP | 06308946 | A | * | 11/1994 | |
| JP | 2003-036085 | A | | 2/2003 | |
| JP | 2003036085 | A | * | 2/2003 | |
| JP | 2003036085 | A | | 2/2003 | |
| JP | 2005-215493 | A | | 8/2005 | |
| JP | 2006201614 | A | | 8/2006 | |
| JP | 2007-193156 | A | | 8/2007 | |
| JP | 2007193156 | A | * | 8/2007 | ............... G10H 1/44 |
| JP | 2013-114088 | A | | 6/2013 | |
| JP | 2013114088 | A | * | 6/2013 | |
| JP | 2014-191192 | A | | 10/2014 | |
| JP | 2014191192 | A | * | 10/2014 | |
| JP | 2014191192 | A | | 10/2014 | |

OTHER PUBLICATIONS

International Search Report and Written Opinion of PCT Application No. PCT/JP2016/081810, dated Dec. 26, 2016, 08 pages of English Translation and 07 pages of ISRWO.
International Preliminary Report on Patentability of PCT Application No. PCT/JP2016/081810, dated May 24, 2018, 09 pages of English Translation and 04 pages of IPRP.
Notice of Reasons for Refusal in JP 2015-220445 dated Mar. 4, 2020.

* cited by examiner

TUNING ESTIMATING APPARATUS, EVALUATING APPARATUS, AND DATA PROCESSING APPARATUS

CROSS REFERENCE TO RELATED APPLICATIONS

This application is a U.S. National Phase of International Patent Application No. PCT/JP2016/081810 filed on Oct. 27, 2016, which claims priority benefit of Japanese Patent Application No. JP 2015-220445 filed in the Japan Patent Office on Nov. 10, 2015. Each of the above-referenced applications is hereby incorporated herein by reference in its entirety.

TECHNICAL FIELD

The present invention relates to a technology for calculating a tuning value. Furthermore, the present invention relates to a technology for evaluating the singing of a song or the playing of a musical instrument based on a calculated tuning value. Moreover, the present invention is concerned with a technology for synthesizing singing data and playing data based on a calculated tuning value.

BACKGROUND ART

Many karaoke apparatus and musical instrument playing evaluation apparatus incorporate a function to analyze and evaluate input sounds such as singing voices or playing sounds. Input sounds are evaluated by comparing the pitches of singing voices or playing sounds and the pitches of a guide melody to be sung or played with each other and assessing the extent to which the compared pitches agree with each other (see, for example, PTL 1). There has also been developed a technology for evaluating the pitches of singing voices or playing sounds when a singer sings a song or a performer plays a musical instrument with the pitches of an instrumental accompaniment adjusted in half tones, by correcting the pitches of singing voices or playing sounds based on the pitch information of the instrumental accompaniment (see, for example, PTL 2).

CITATION LIST

Patent Literature

[PTL 1]
 JP 2005-215493A
[PTL 2]
 JP 1994-295192A

SUMMARY

Technical Problems

However, since the technology disclosed in PTL 1 uses a guide melody as an assessment criterion, each song to be sung or a piece of music to be performed requires information that serves as an assessment criterion. Furthermore, when a singer has sung a song with an instrumental accompaniment changed in pitch or a player has intentionally changed the tuning on its musical instrument, the singing or the playing cannot properly be evaluated in the absence of the tuning information. According to the technology disclosed in PTL 2, information about the changed pitches of the instrumental accompaniment is needed for proper evaluation.

It is an object of the present invention to calculate tuning information based on input sounds.

Solution to Problems

A tuning estimating apparatus according to an embodiment of the present invention includes a first input sound acquirer for acquiring input sounds, a pitch calculator for calculating pitches of the input sounds acquired by the first input sound acquirer, and a tuning value calculator for calculating a tuning value representing an offset between a tuning reference position serving as a reference for tuning and a reference position on a first distribution of the pitches calculated by the pitch calculator, based on a peak of the first distribution.

The tuning value calculator may calculate the tuning value based on a peak group including a plurality of peaks of the first distribution.

The tuning value calculator may calculate the tuning value based on the positional relationship of the peak group which has periodicity.

The tuning value calculator may calculate the tuning value based on deviations between the peak group and a plurality of reference pitches including the tuning reference position.

The tuning estimating apparatus may further comprise a pitch converter for dividing the first distribution into a plurality of distributions starting from reference points disposed at constant periods, and calculating a second distribution by integrating the divided distributions, wherein the tuning value calculator may calculate the tuning value based on peaks of the second distribution integrated by the pitch converter.

Intervals between respective lengths of the distributions divided by the pitch converter may be equal to intervals between adjacent ones of the reference pitches including the tuning reference position.

The tuning estimating apparatus may further include a pitch smoothing processor for calculating a third distribution by smoothing the second distribution, wherein the tuning value calculator may search the third distribution calculated by the pitch smoothing calculator for peaks, and the peaks of the second distribution may be determined based on the peaks of the third distribution.

The tuning estimating apparatus may further include a plurality of evaluators for calculating evaluation values with respect to the input sounds based on comparison between a peak group and a plurality of reference pitches including tuning reference positions. The tuning reference positions of the different evaluators have respective offsets, and the tuning value calculator may calculate the tuning value based on the evaluation values calculated by the evaluators and the tuning reference positions of the evaluators.

A tuning estimating apparatus according to an embodiment of the present invention includes a first input sound acquirer for acquiring input sounds, a pitch calculator for calculating pitches of the input sounds acquired by the first input sound acquirer, and a plurality of evaluators for calculating evaluation values with respect to the input sounds based on comparison with reference pitches at tuning reference positions serving as references for tuning, wherein the tuning reference positions of the respective different evaluators are different from each other, and the tuning value calculator calculates a tuning value based on the tuning reference position of the evaluator which has calculated one of the evaluation values calculated respectively by the evaluators.

An evaluating apparatus may include the above tuning estimating apparatus, a pitch comparator for comparing, in a predetermined evaluation zone, the pitches and the reference pitches based on the pitches of the input sounds, the reference pitches, and the tuning value calculated by the tuning value calculator, and a score calculator for calculating a score value with respect to the input sounds based on the result of comparison from the pitch comparator.

A data processing apparatus may include the above tuning estimating apparatus, a second input sound acquirer for acquiring a first input sound and a second input sound, a corrector for correcting the relationship between the first input sound and the second input sound based on the first input sound, the second input sound, and the tuning value calculated by the tuning estimating apparatus, and a synthesizer for synthesizing the first input sound and the second input sound corrected by the corrector, wherein the tuning estimating apparatus may calculates the tuning base based on the first input sound.

The tuning estimating apparatus may calculate a first tuning value based on the first input sound and calculate a second tuning value based on the second input sound, and the corrector may correct the relationship between the first input sound and the second input sound based on the first input sound, the second input sound, the first tuning value, and the second tuning value.

A tuning estimating apparatus according to an embodiment of the present invention includes an input sound acquirer for acquiring input sounds, a pitch calculator for calculating pitches of the input sounds acquired by the input sound acquirer, and a tuning value calculator for calculating, for respective pitches, tuning values representing offsets between peaks of a distribution of the pitches calculated by the pitch calculator and references established for the pitches.

The tuning value calculator may calculate the tuning values for the pitches, respectively, from the distributions.

A program according to an embodiment of the present invention acquires input sounds, calculates pitches of the acquired input sounds, and calculates a tuning value representing an offset between a tuning reference position serving as a reference for tuning and a reference position on a first distribution of the calculated pitches, based on a peak group including a plurality of peaks of the first distribution.

Advantageous Effect of Invention

According to the embodiments of the present invention, it is possible to calculate tuning information based on input sounds.

DESCRIPTION OF EMBODIMENTS

Tuning estimating apparatus according to embodiments of the present invention will hereinafter be described below with reference to the drawings. The embodiments to be described below are illustrated by way of example, and the present invention is not limited to these embodiments.

First Embodiment

A tuning estimating apparatus according to a first embodiment of the present invention will be described in detail below with reference to the drawings. The tuning estimating apparatus according to the first embodiment is an apparatus for estimating a tuning value for the singing voices of a user who sings a song (hereinafter also referred to as "singer"). The tuning estimating apparatus compares a plurality of pitches determined per predetermined period (hereinafter also referred to as "reference pitches") and the pitches of singing voices of the singer (hereinafter also referred to as "singing pitches") with each other, and calculates a tuning value. The tuning estimating apparatus is capable of obtaining a tuning value in the absence of a guide melody or information about changed pitches of an instrumental accompaniment because the tuning estimating apparatus can calculate a tuning value based on the singing pitches. The tuning estimating apparatus will hereinafter be described below.

[Hardware]

Figure 1:
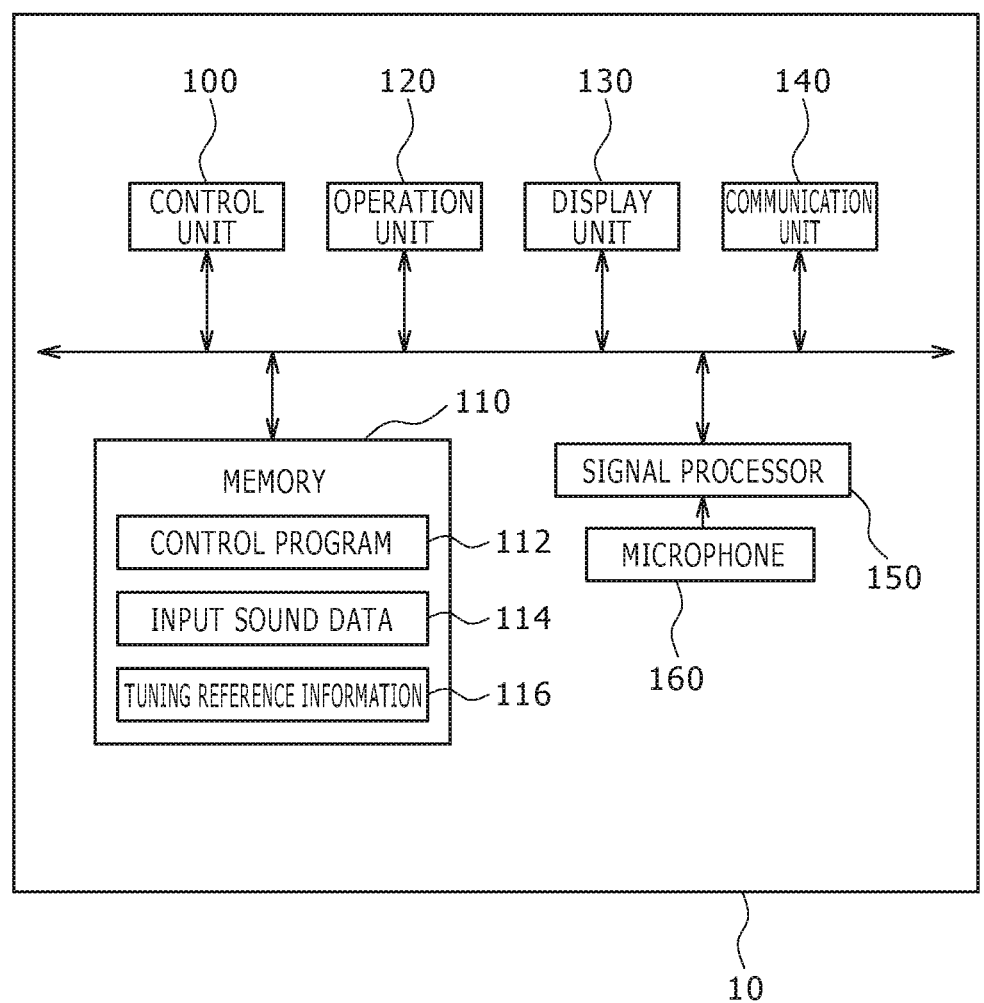
FIG. 1 is a block diagram depicting a hardware configuration of a tuning estimating apparatus according to an embodiment of the present invention.

FIG. 1 is a block diagram depicting a hardware configuration of the tuning estimating apparatus 10 according to the embodiment of the present invention. The tuning estimating apparatus, denoted by 10, includes a control unit 100, a memory 110, an operation unit 120, a display unit 130, a communication unit 140, and a signal processor 150. These components are interconnected by a bus. A microphone 160 is connected to the signal processor 150.

The control unit 100 includes an arithmetic processing circuit such as a CPU or the like. The control unit 100 enables the tuning estimating apparatus 10 to perform various functions by having the CPU execute a control program 112 stored in the memory 110. The functions that are performed include a function to estimate a tuning value for singing voices. The memory 110 includes a memory such as a nonvolatile memory, a hard disk, or the like. The memory 110 stores therein the control program 112 for performing the tuning estimating function. The control program 112 may be provided as being stored in a computer-readable recording medium such as a magnetic recording medium, an optical recording medium, a magnetooptical recording medium, a semiconductor memory, or the like. In this case, the tuning estimating apparatus 10 may have a device for reading the recording medium. Alternatively, the control program 112 may be downloaded via a network.

The memory 110 stores, in addition to the control program 112, input sound data 114 and tuning reference information 116. The input sound data 114 refer to data representing singing voices that the singer has entered through the microphone 160. In this example, the input sound data 114 are buffered in the memory 110 until a tuning value for the singing voices is calculated by the tuning estimating function. The tuning reference information 116 refers to information which a tuning estimating functional unit 200 to be described later uses as a reference for calculating a tuning value for the singing voices. For example, the tuning reference information 116 has reference pitches defined therein that are to be compared with the singing pitches. The reference pitches are defined as a plurality of pitches. In this example, the reference pitches include 440 Hz at a tuning reference position and are defined at intervals of 100 cents from the reference of 440 Hz. If a musical piece has a tuning reference position shifted from 440 Hz, e.g., has a tuning reference position of 442 Hz, then the reference pitches may be defined at intervals of 100 cents from the reference of 442 Hz.

The operation unit 120 refers to devices such as operation buttons provided on an operation panel and a remote controller, a keyboard, and a mouse, etc., and outputs signals depending on entered operations to the control unit 100. The display unit 130 refers to a display device such as a liquid crystal display, an organic EL display, or the like, and displays images under the control of the control unit 100. The operation unit 120 and the display unit 130 may be integrally combined into a touch panel. The communication unit 140 connects to a communication link such as the Internet or the like to send information to and receive information from an external apparatus such as a server or the like under the control of the control unit 100. The function of the memory 110 may be performed by an external device that can communicate with the communication unit 140.

The signal processor 150 includes an A/D converter. Singing voices are converted by the microphone 160 into an electric signal, which is input to the signal processor 150. The A/D converter in the signal processor 150 converts the electric signal into a digital signal, which is output to the control unit 100. As described above, singing voices are buffered as singing voice data in the memory 110.

[Tuning Estimating Functional Unit]

A tuning estimating functional unit will be described below. The function of the tuning estimating functional unit is performed when the control unit 100 of the tuning estimating apparatus 10 executes the control program 112. The configuration of the tuning estimating functional unit to be described below may partly or wholly be implemented by hardware.

Figure 2:
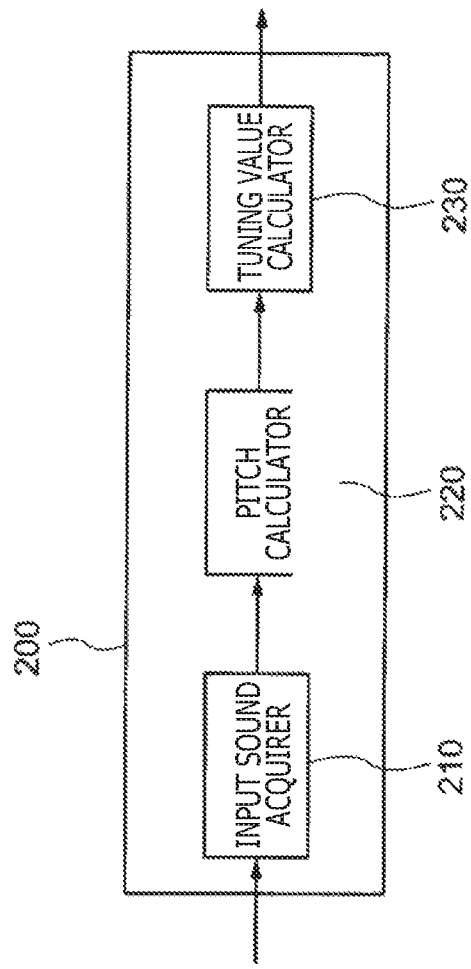
FIG. 2 is a block diagram depicting a functional configuration of a tuning estimating functional unit according to the embodiment of the present invention.

FIG. 2 is a block diagram depicting a functional configuration of the tuning estimating functional unit according to the embodiment of the present invention. The tuning estimating functional unit, denoted by 200, includes an input sound acquirer 210, a pitch calculator 220, and a tuning value calculator 230.

The input sound acquirer 210 acquires singing voice data (input sounds) representing singing voices input from the microphone 160. The input sound acquirer 210 that acquires singing voice data buffered in the memory 110 may acquire singing voice data of one musical piece after they have been stored in the memory 110. However, the input sound acquirer 210 may acquire singing voice data directly from the signal processor 150. The input sound acquirer 210 may acquire not only singing voice data representing input sounds input to the microphone 160, but also singing voice data representing input sounds input to an external device from the communication unit 140 via a network.

The pitch calculator 220 analyzes singing voice data acquired by the input sound acquirer 210, and calculates time-dependent changes in singing pitches (frequencies), i.e., a singing pitch waveform. Specifically, the pitch calculator 220 calculates a singing pitch waveform according to a known process such as a process using zero crossings of a waveform of singing voices, a processing using FFT (Fast Fourier Transform), or the like.

Figure 3:
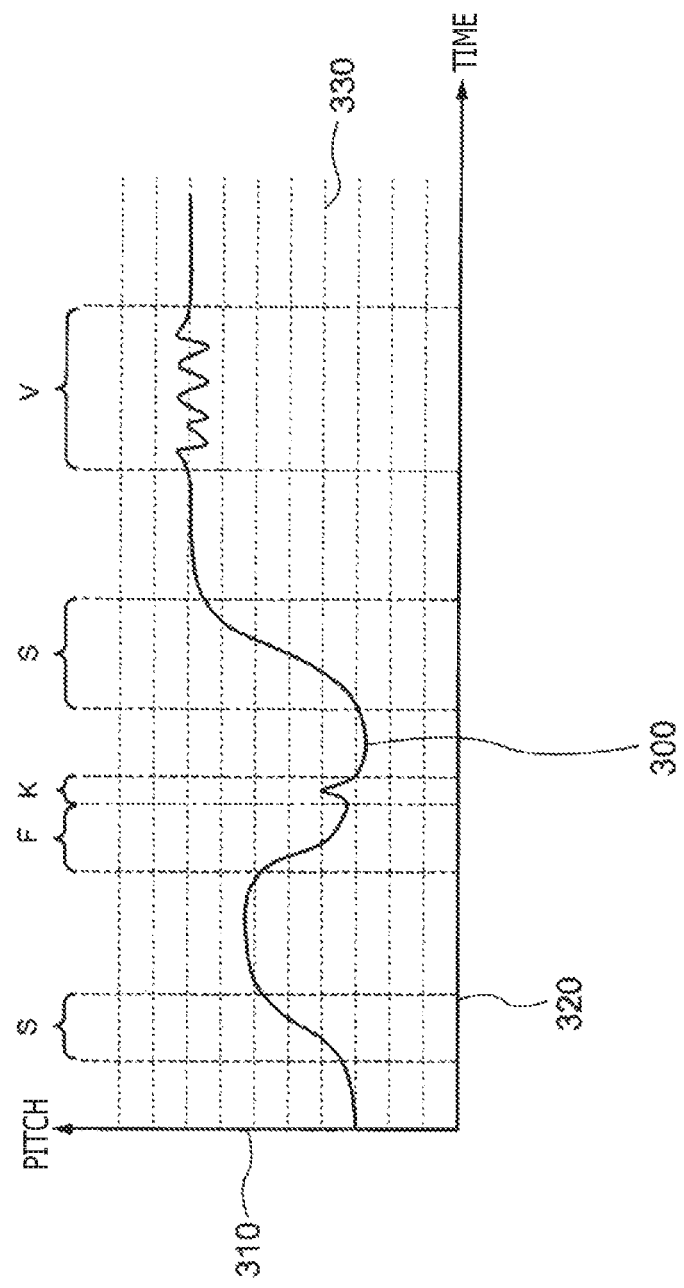
FIG. 3 is a diagram depicting an example of acquired pitches in a tuning process according to the embodiment of the present invention.

FIG. 3 is a diagram depicting an example of acquired pitches in a tuning process according to the embodiment of the present invention. FIG. 3 depicts an example of a singing pitch waveform 300 as part of the singing of a song. In FIG. 3, a vertical axis 310 represents pitches, broken lines placed at intervals of 100 cents in a pitch direction represent a plurality of reference pitches 330, and a horizontal axis 320 represents time. Symbols S, F, K, V in FIG. 3 will be described in detail later.

The tuning value calculator 230 calculates a tuning value based on a peak group including a plurality of peaks in a frequency distribution (first distribution) of singing pitches calculated by the pitch calculator 220. The first distribution is obtained based on the singing pitch waveform 300 depicted in FIG. 3. Specifically, the tuning value calculator 230 segments the pitches into pitch ranges each having a predetermined pitch width (e.g., 2 cents), and calculates frequencies of singing pitches in the respective pitch ranges, i.e., the numbers of samples including singing pitches in the respective pitch ranges, thereby calculating a frequency distribution. Then, the tuning value calculator 230 calculates a tuning value based on deviations (offset values) between a plurality of peak positions in the calculated frequency distribution and a plurality of reference pitches established for the frequency distribution. A specific process of calculating a tuning value will be described below.

Figure 4:
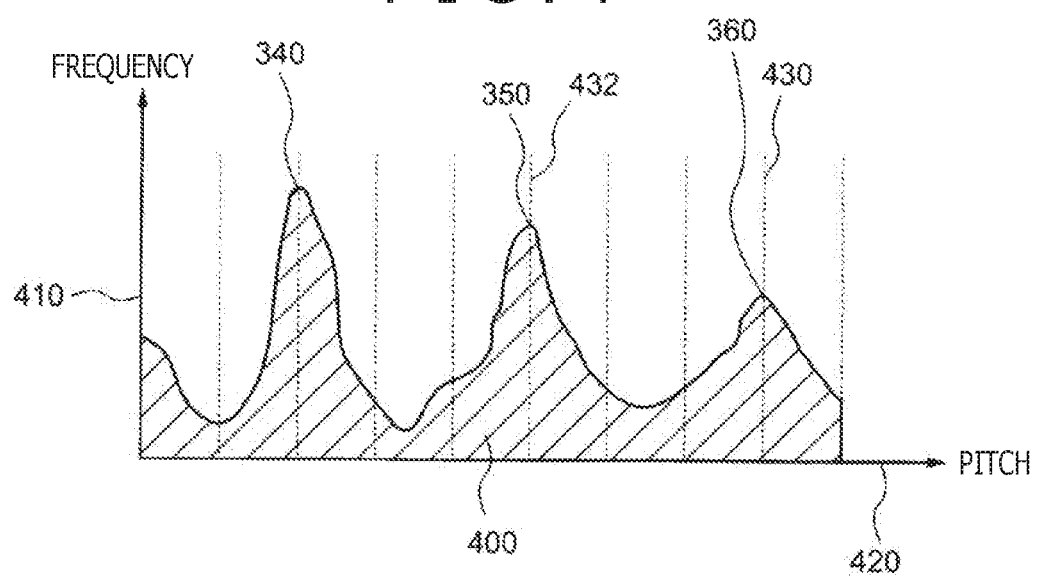
FIG. 4 is a diagram depicting a frequency distribution of calculated pitches in the tuning process according to the embodiment of the present invention.

FIG. 4 is a diagram depicting a frequency distribution of calculated pitches in the tuning process according to the embodiment of the present invention. In FIG. 4, a horizontal axis 420 represents pitches (pitch ranges) in cents and a vertical axis 410 represents frequencies in the pitch ranges. Broken lines spaced at predetermined intervals along the horizontal axis 420 represent a plurality of reference pitches 430. The reference pitches 430 are disposed at spaced intervals of 100 cents. A first distribution 400 has a peak group including peaks 340, 350, and 360 in the vicinity of respective reference pitches 430. This is because the singing pitches tend to come together around the reference pitches 430 as the singer tries to sing to the instrumental accompaniment. The first distribution 400 depicted in FIG. 4 illustrates an example wherein any deviations between the peaks 340, 350, and 360 and the respective reference pitches 430 corresponding thereto are almost nil, i.e., a tuning value is essentially zero. Of the reference pitches 430, a tuning reference position 432 that serves as a reference for tuning is aligned with 440 Hz. Of the peak group, the peak 350 that corresponds to the tuning reference position 432 is also aligned with 440 Hz. The peak 350 corresponds to a reference position on the first distribution 400.

Figure 5:
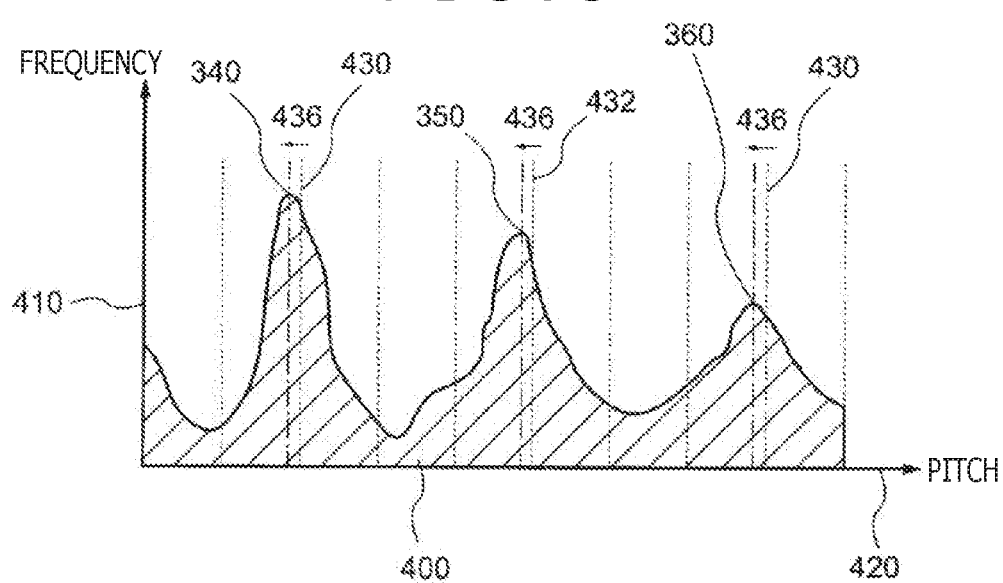
FIG. 5 is a diagram depicting an example of a process of calculating a tuning value in the tuning process according to the embodiment of the present invention.

FIG. 5 is a diagram depicting an example of a process of calculating a tuning value in the tuning process according to the embodiment of the present invention. FIG. 5 illustrates a situation wherein the peaks 340, 350, and 360 and the reference pitches 430 deviate from each other. In FIG. 5, as with FIG. 4, a horizontal axis 420 represents pitches (pitch ranges) in cents and a vertical axis 410 represents frequencies in the pitch ranges. In FIG. 5, a tuning reference position 432 is aligned with 440 Hz, but the peak 350 deviates from 440 Hz. Specifically, there is an offset 436 between the tuning reference position 432 and the peak 350 that corresponds to the reference position on the first distribution 400. Stated otherwise, the peaks 340, 350, and 360 deviate in the same direction from the respective reference pitches 430 that are established at positions corresponding to these peaks. The deviation (offset value) is calculated as a tuning value.

In the above example, a tuning value is calculated based on the positional relationship between the peaks 340, 350, and 360 and the reference pitches 430 corresponding thereto. However, the present invention is not limited to such an example. For example, a tuning value may be calculated based on the positional relationship between positions based on the shapes of mountains (convex distributions) including the respective peaks 340, 350, and 360 and the reference pitches 430 corresponding to these mountains. For example, a deviation between an average value of a Gaussian distribution obtained based on the shape of a mountain including the peak 340 and the reference pitch 430 corresponding to that mountain, may be calculated as a tuning value.

If deviations between the peaks 340, 350, and 360 and the reference pitches 430 corresponding thereto are different from each other, then a tuning value may be calculated as follows:

(1) A deviation between the highest peak and the reference pitch 430 corresponding to that peak is used as a tuning value.

(2) An average of deviations of the peaks from the reference pitches 430 corresponding thereto is used as a tuning value.

(3) The heights of the peaks are added as weights to deviations of the peaks from the reference pitches 430 corresponding thereto, or deviations of the peaks from the reference pitches 430 corresponding thereto are multiplied by the heights of the peaks as weights, and an average of the deviations with the weights is used as a tuning value.

(4) A pitch tuning value is calculated for a musical instrument that has been stretch-tuned by using deviations of the peaks from the reference pitches 430 corresponding thereto as a tuning value for each of the pitches played.

According to the process of calculating a tuning value at (4) among the above processes, a tuning value is calculated for each scale on the piano, and for each string on the guitar, for example. In this manner, if the program has a recommended stretch tuning value in advance, then it is possible to give the user a comment "Your performance will sound bright and resonant if A5 tuning is 5 cents up," for example, based on deviations from the recommended tuning value.

The tuning estimating functional unit 200 may be incorporated in one computer. Alternatively, the tuning estimating functional unit 200 may be incorporated in a plurality of computers. In other words, the functions of the input sound acquirer 210, the pitch calculator 220, and the tuning value calculator 230 may be performed by the computers working together. For example, the input sound acquirer 210, the pitch calculator 220, and the tuning value calculator 230 may partly or wholly be incorporated in different computers, and these computers may carry out data communication through a network thereby to perform the function of the tuning estimating functional unit 200.

As described above, since the tuning estimating apparatus 10 according to the first embodiment of the present invention is capable of calculating a tuning value based on a peak group in a frequency distribution of pitches, the tuning estimating apparatus 10 can calculate tuning information based on input sounds in the absence of a guide melody or information about changed pitches of an instrumental accompaniment.

After noise has been removed from the singing pitch waveform 300 depicted in FIG. 3, the first distribution 400 depicted in FIG. 4 may be calculated. For example, pitches that are acquired in fragments (short pitches equal to or less than a predetermined time) may be judged as noise and a noise reduction process may be carried out so as not to include such noise in the first distribution 400. If the volume of input sounds is equal to or lower than a predetermined volume level, or if the volume of input sounds varies beyond a predetermined variation level, then the input sounds may be judged as noise and a noise reduction process may be carried out so as not to include such noise in the first distribution 400. Furthermore, a region in which the variation of the volume of input sounds is stable below a predetermined variation level may be judged as a tuning estimating region, and the first distribution 400 may be calculated based on the pitches in the region. Moreover, a region in which the pitches of input sounds are horizontal may be judged as a tuning estimating region, and the first distribution 400 may be calculated based on the pitches in the region. Pitches that are horizontal mean that pitches in a predetermined period do not vary or the rate of variability of pitches in a predetermined period is equal to or below a certain level. If there are data that serve as a model for singing or performance (for example, MIDI data), then a tuning estimating region may be determined from the MIDI data.

Second Embodiment

Figure 6:
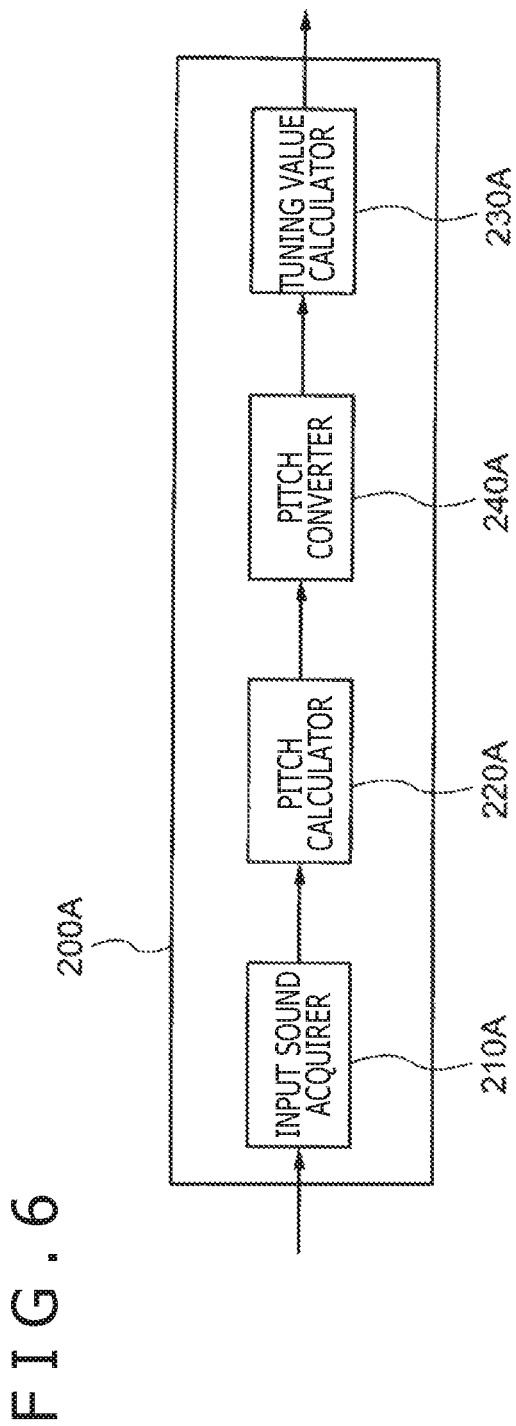
FIG. 6 is a block diagram depicting a functional configuration of a tuning estimating functional unit according to an embodiment of the present invention.

A configuration of a tuning estimating functional unit 200A included in a tuning estimating apparatus 10A according to a second embodiment of the present invention and an estimating process carried out thereby will be described below with reference to FIGS. 6, 7A, 7B and 7C and 8. In the second embodiment, a hardware configuration of the tuning estimating apparatus is the same as that of the first embodiment, and will not be described below. FIG. 6 is a block diagram depicting a functional configuration of a tuning estimating functional unit according to an embodiment of the present invention. The tuning estimating functional unit 200A is different from the tuning estimating apparatus 10 according to the first embodiment in that a pitch converter 240A is provided between a pitch calculator 220A and a tuning value calculator 230A.

Figure 7:
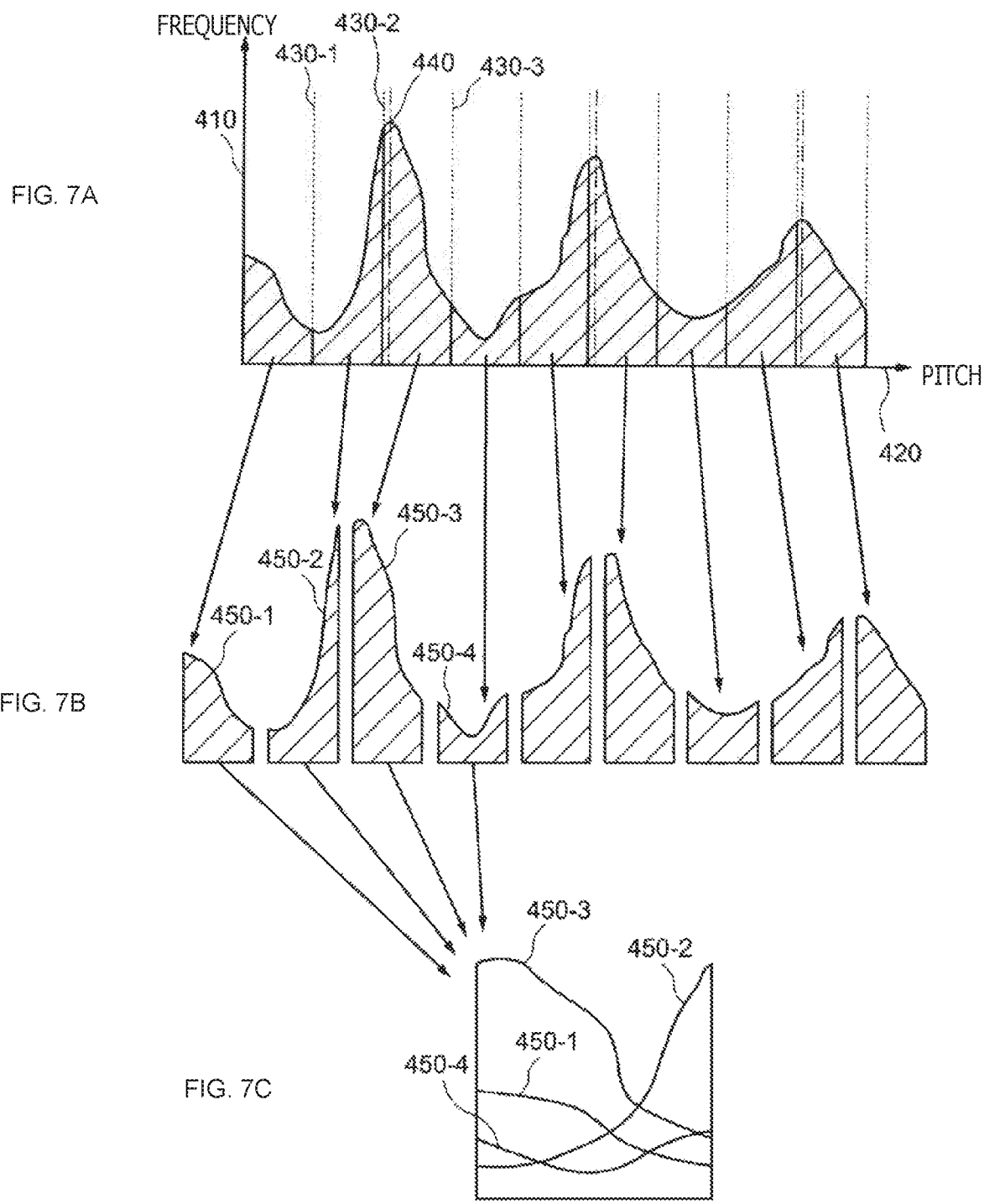
FIGS. 7A, 7B and 7C are diagrams depicting an example of a process of converting a first distribution to a second distribution in a pitch converter in a tuning process according to the embodiment of the present invention.

The pitch converter 240A divides the first distribution 400 depicted in FIG. 4, for example, into a plurality of distributions, and integrates the divided distributions to calculate a second distribution. Each of the distributions is a distribution that has a starting point at one of the reference points disposed at certain periods in the first distribution 400. FIGS. 7A, 7B and 7C are diagrams depicting an example of a process of converting a first distribution to a second distribution in a pitch converter in a tuning process according to the embodiment of the present invention. The converting process will be specifically described below with reference to FIGS. 7A, 7B and 7C. As depicted in FIGS. 7A and 7B, the pitch converter 240A divides the first distribution 400 depicted in FIG. 4 into a plurality of distributions 450 (distributions 450-1, 450-2, 450-3, and 450-4, which will be referred to as distributions 450 if not particularly distinguished from each other), using reference pitches 430 (reference pitches 430-1, 430-2, and 430-3, which will be referred to as reference pitches 430 if not particularly distinguished from each other) disposed at certain periods as boundaries. Since the divided distributions 450 have respective starting points at the respective reference pitches 430, the width of each of the divided distributions 450 along the horizontal axis is the same as the interval between adjacent reference pitches 430. In other words, each of the distributions 450 represents a frequency distribution having a zero point at the reference pitch 430 and a pitch width of 100 cents. As depicted in FIG. 7C, the pitch converter 240A integrates the divided distributions 450 by converting their horizontal axes such that the reference pitches 430 as their starting points are aligned with each other. In FIG. 7C, only the distributions 450-1, 450-2, 450-3, and 450-4 are depicted as being integrated for illustrative purposes. However, all of the divided distributions may be integrated.

The above converting process may be stated otherwise as follows: Providing the pitch width of the divided distributions 450 is 100 cents, the pitch converter 240A divides the first distribution 400 into a plurality of distributions 450 whose horizontal axis is represented by the value of a remainder from dividing the pitch value of the first distribution 400 depicted in FIG. 5 by 100, and integrates the divided distributions 450. In other words, the horizontal axis P of the first distribution 400 can be converted into the horizontal axis $X_A$ of the second distributions 450 according to the following equation:

$$X_A = P \cdot \mathrm{mod}(100 \text{ cents})$$

Figure 8:
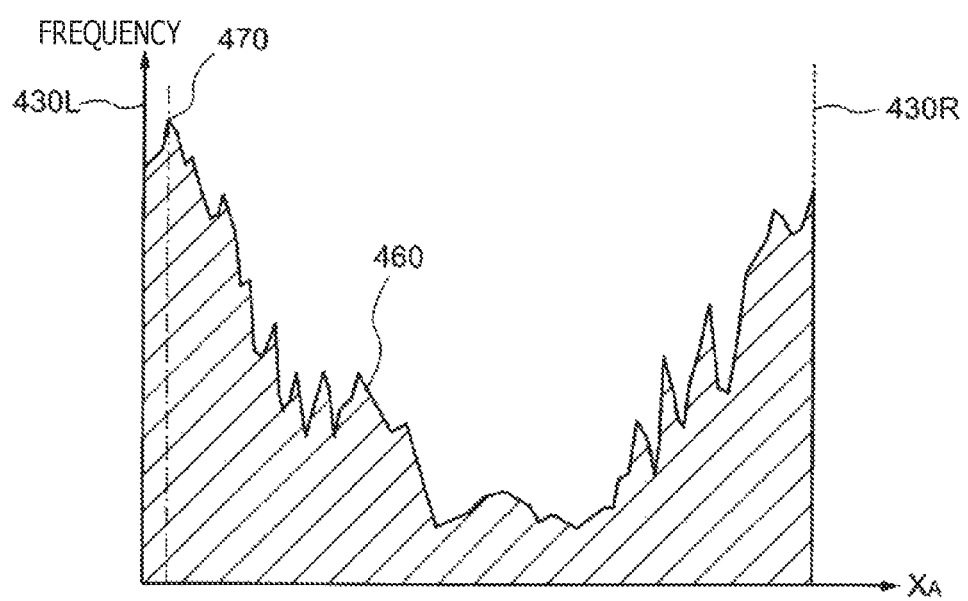
FIG. 8 is a diagram depicting an example of an integrated second distribution in the tuning process according to the embodiment of the present invention.

FIG. 8 is a diagram depicting an example of an integrated second distribution in the tuning process according to the embodiment of the present invention. As depicted in FIG. 8, a second distribution 460 produced by integrating the divided distributions 450 depicted in FIGS. 7A, 7B and 7C represents a frequency distribution which has high frequencies at both ends thereof and low frequencies in the vicinity of its center. This is because the pitch converter 240A divides the first distribution 400 in the vicinity of its peaks. The both ends of the second distribution 460 correspond to the reference pitches 430 depicted in FIGS. 7A, 7B and 7C. In FIG. 8, the left end of the second distribution 460 is referred to as a reference pitch 430L, whereas the right end thereof as a reference pitch 430R. In FIG. 8, the integrated second distribution 460 has an integrated peak 470 (peak of the second distribution 460) close to the reference pitch 430L. The pitch converter 240A thus generates a distribution that reflects the periodicity of the peak group of the first distribution 400.

The tuning value calculator 230A calculates a tuning value based on the integrated second distribution 460 depicted in FIG. 8. Specifically, a tuning value is calculated based on a deviation of the integrated peak 470 and the integrated second distribution 460 in a positive direction from the reference pitch 430L or in a negative direction from the reference pitch 430R. In other words, a tuning value represents a relative deviation from the reference pitches 430. According to the second embodiment, the length of each of the divided distributions 450 is defined as the interval between adjacent reference pitches 430. However, the length of each of the divided distributions 450 may be the interval over a plurality of reference pitches 430. In this case, since each of the distributions 450 includes a plurality of peaks, a tuning value may be calculated in the same way as (1) through (4) described above.

As described above, since the tuning estimating apparatus 10A according to the second embodiment of the present invention is capable of calculating a tuning value based on a peak group in a frequency distribution of pitches, the tuning estimating apparatus 10A can calculate tuning information based on input sounds in the absence of a guide melody or information about changed pitches of an instrumental accompaniment. As the tuning estimating apparatus 10A is capable of calculating a tuning value based on the second distribution 460 that reflects the periodicity of the first distribution 400, the tuning estimating apparatus 10A can calculate a more accurate tuning value.

Third Embodiment

Figure 9:
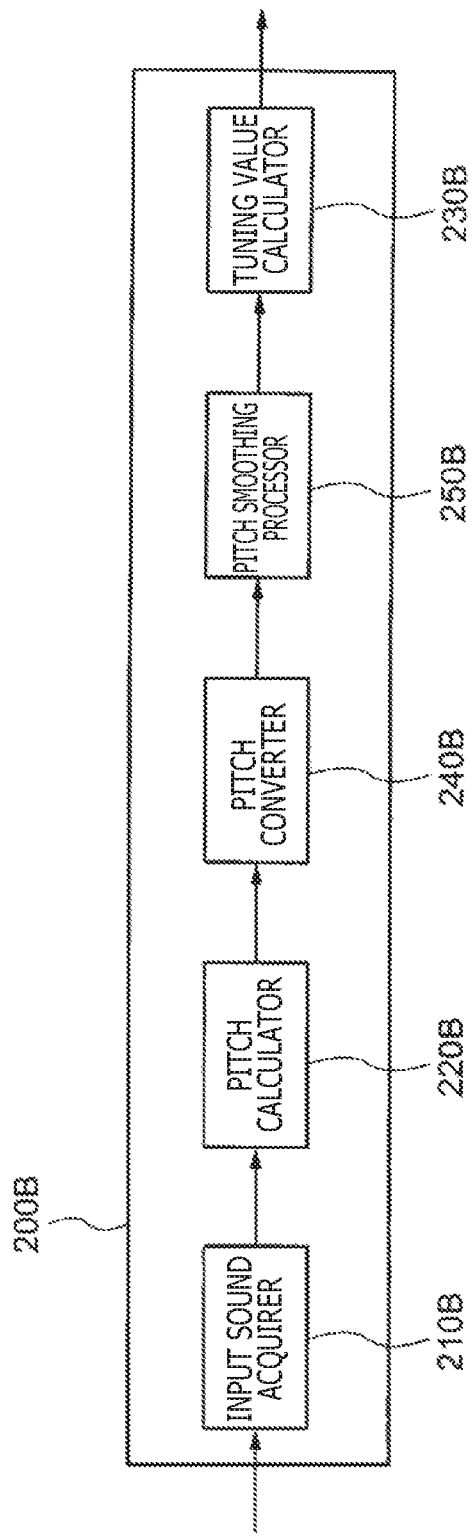
FIG. 9 is a block diagram depicting a functional configuration of a tuning estimating functional unit according to an embodiment of the present invention.
Figure 10:
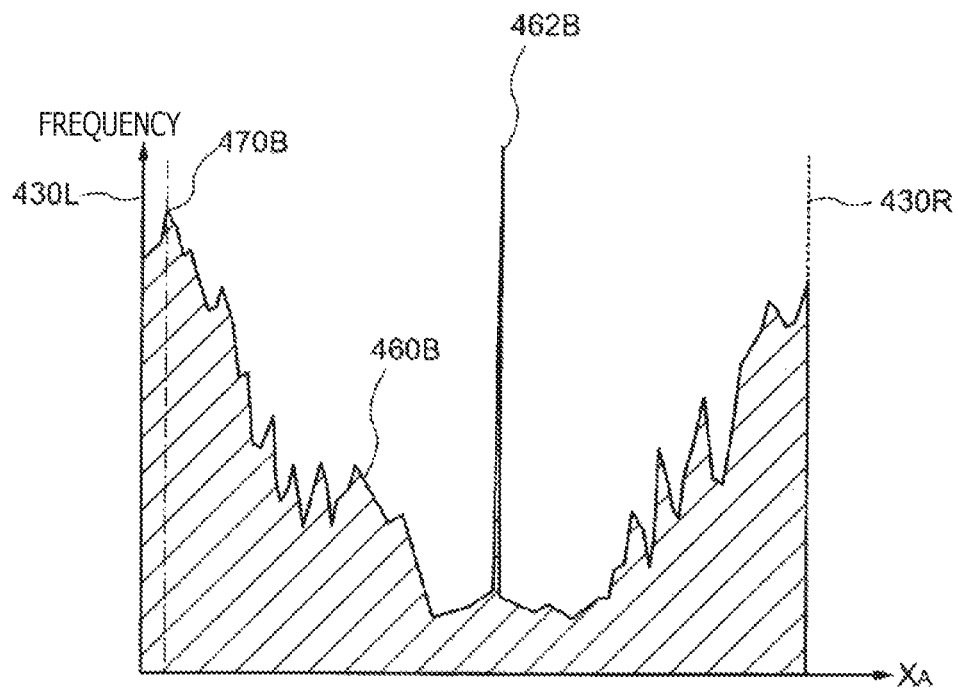
FIG. 10 is a diagram depicting an example of an integrated second distribution in a tuning process according to the embodiment of the present invention.
Figure 11:
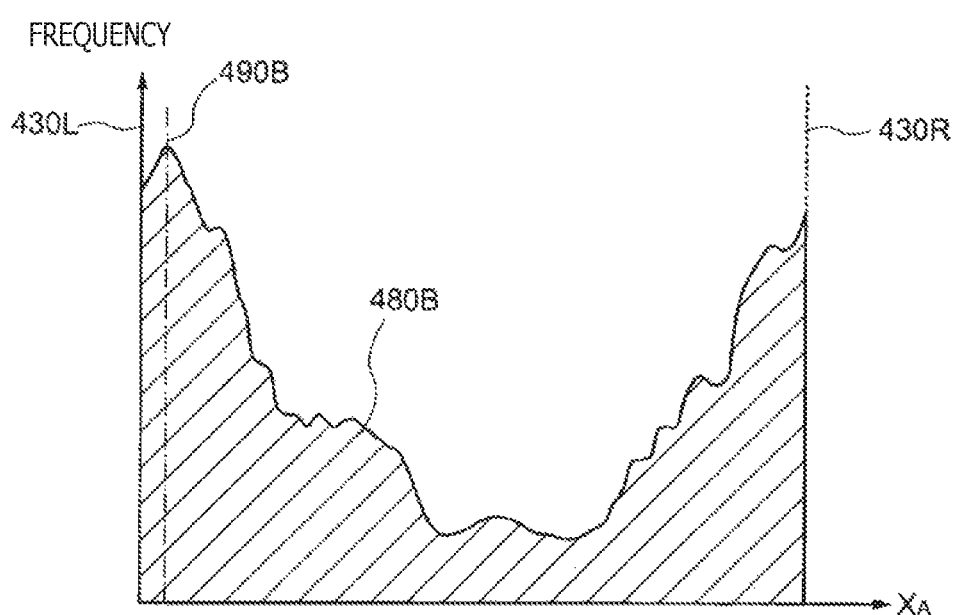
FIG. 11 is a diagram depicting an example of a smoothed third distribution in the tuning process according to the embodiment of the present invention.

A configuration of a tuning estimating functional unit 200B included in a tuning estimating apparatus 10B according to a third embodiment of the present invention and an estimating process carried out thereby will be described below with reference to FIGS. 9 through 11. In the third embodiment, a hardware configuration of the tuning estimating apparatus is the same as that of the first embodiment, and will not be described below. FIG. 9 is a block diagram depicting a functional configuration of a tuning estimating functional unit according to an embodiment of the present invention. The tuning estimating functional unit 200B is different from the tuning estimating apparatus 10A according to the second embodiment in that a pitch smoothing processor 250B is provided between a pitch converter 240B and a tuning value calculator 230B.

A specific processing process of the pitch smoothing processor 250B will be described below with reference to FIGS. 10 and 11. FIG. 10 is a diagram depicting an example of an integrated second distribution in a tuning process according to the embodiment of the present invention. FIG. 11 is a diagram depicting an example of a smoothed third distribution in the tuning process according to the embodiment of the present invention. The pitch smoothing processor 250B performs a smoothing process on an integrated second distribution 460B depicted in FIG. 10 to obtain a third distribution 480B depicted in FIG. 11. The smoothing process may use a moving average or a low-pass filter.

If the second distribution 460B includes a sharp noise peak 462B caused by noise, for example, then a tuning value is calculated using the noise peak 462B instead of a second peak 470B. Even in this case, the smoothing processes performed by the pitch smoothing processor 250B removes or makes inconspicuous the noise peak 462B. The tuning value calculator 230B then calculates a tuning value based on a smoothed peak 490B (peak of the third distribution 480B).

As described above, since the tuning estimating apparatus 10B according to the third embodiment of the present invention is capable of calculating a tuning value based on a peak group in a frequency distribution of pitches, the tuning estimating apparatus 10B can calculate tuning information based on input sounds in the absence of a guide melody or information about changed pitches of an instrumental accompaniment. By performing a smoothing process prior to the detection of a peak based on which to calculate a tuning value, a tuning value is prevented from representing an abnormal value due to abrupt noise.

According to the third embodiment, the smoothing process is employed to reduce the influence of noise. However, the present invention is not limited to such a process. In the second distribution 460B depicted in FIG. 10, a value of inclination of the shape of the second distribution 460B with respect to the horizontal axis may be calculated, for example, and if the value of inclination falls outside of a predetermined range, the region that includes the value of inclination may be excluded from those from which to calculate a tuning value. The value of inclination may represent an inclination between adjacent pitches or may represent an inclination based on a plurality of pitches. According to the third embodiment, the smoothing process is performed on the second distribution 460B. However, the present invention is not limited to such a process. The smoothing process may be performed on the first distribution 400 depicted in FIGS. 4 and 5, for example. After the smoothing process has been performed on the first distribution 400, the first distribution 400 may be divided into a plurality of distributions, which may be integrated to generate the second distribution 460B.

Fourth Embodiment

According to a fourth embodiment, an example in which peaks are narrowed down to a peak to be used to calculate a tuning value based on a smoothed peak 490B depicted in FIG. 11 will be described below. A hardware configuration of the tuning estimating apparatus and a configuration of the tuning estimating functional unit are the same as those of the third embodiment, and will not be described below. According to the fourth embodiment, a third distribution 480B including a smoothed peak 490B is calculated by a smoothing process in the same manner as with the third embodiment, and a limited region corresponding to the position of the smoothed peak 490B is searched for a peak of the second distribution 460B depicted in FIG. 10. The region corresponding to the position of the smoothed peak 490B may be a region including a predetermined range from the position of the smoothed peak 490B, for example. Specifically, the region including the predetermined range may be a region covering 10 cents above and below the smoothed peak 490B. Alternatively, the region including the predetermined range may be a region covering the average value of a Gaussian distribution including the smoothed peak 490B±a standard deviation ($\sigma$). The region searched for a peak of the second distribution 460B may change depending on the pitch width used for the calculations of the smoothing process (i.e., in what unit of cents the smoothing process is to be performed). Specifically, when the pitch width used for the calculations of the smoothing process increases, the search range is set to a wider range accordingly. According to a specific example, a search range may automatically be established depending on a unit of cents for carrying out the smoothing process, such that if the smoothing process is to be carried out in a unit of 4 cents, then the search range should cover 4 cents above and below the smoothed peak 490B, and if the smoothing process is to be carried out in a unit of 10 cents, then the search range should cover 10 cents above and below the smoothed peak 490B.

As described above, since the tuning estimating apparatus according to the fourth embodiment of the present invention is capable of calculating a tuning value based on a peak group in a frequency distribution of pitches, the tuning estimating apparatus can calculate tuning information based on input sounds in the absence of a guide melody or information about changed pitches of an instrumental accompaniment. By calculating a tuning value using a peak in a narrowed-down region based on a smoothed distribution, a highly accurate tuning value can be calculated while being prevented from representing an abnormal value due to abrupt noise.

Fifth Embodiment

Figure 12:
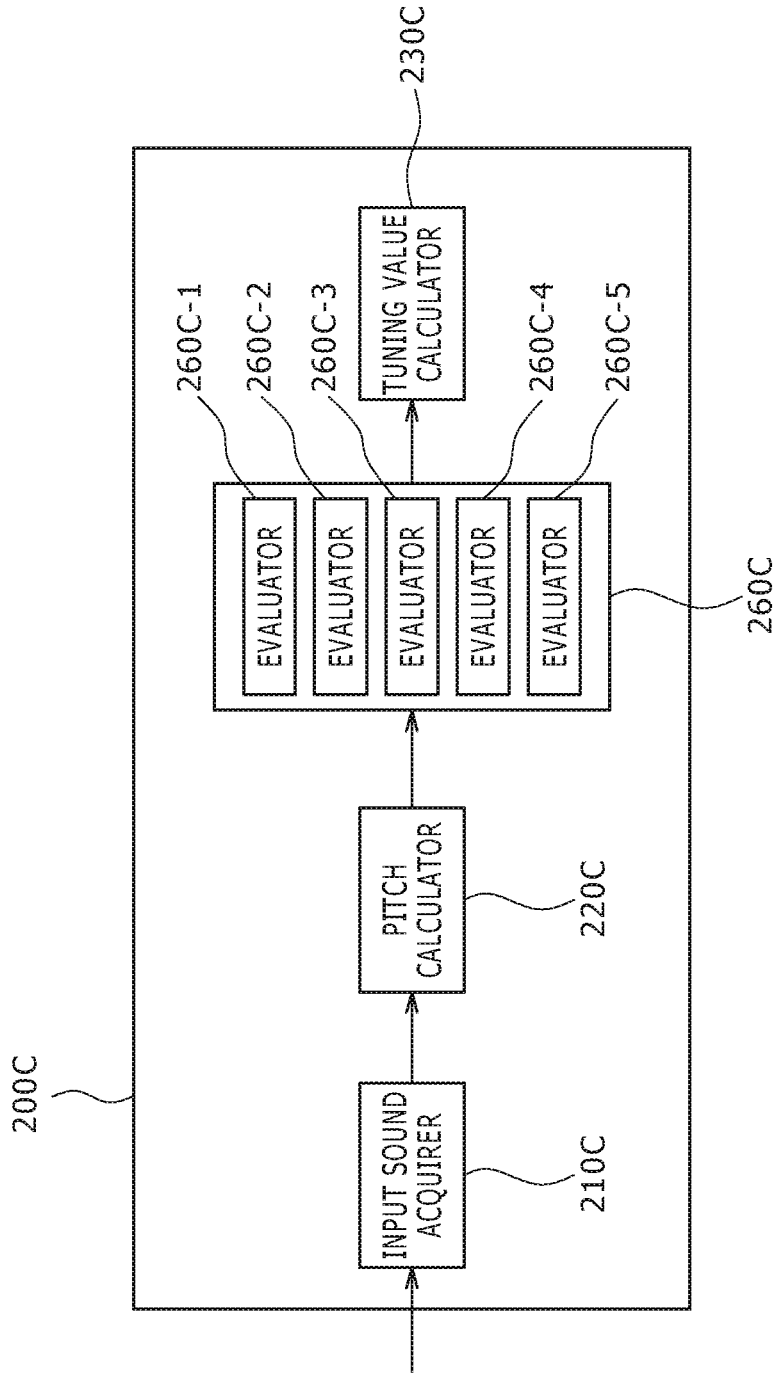
FIG. 12 is a block diagram depicting a functional configuration of a tuning estimating functional unit according to an embodiment of the present invention.

A configuration of a tuning estimating functional unit 200C included in a tuning estimating apparatus 10C according to a fifth embodiment of the present invention and an estimating process carried out thereby will be described below with reference to FIGS. 12 through 14. In the fifth embodiment, a hardware configuration of the tuning estimating apparatus is the same as that of the first embodiment, and will not be described below. FIG. 12 is a block diagram depicting a functional configuration of a tuning estimating functional unit according to an embodiment of the present invention. The tuning estimating functional unit 200C is different from the tuning estimating apparatus 10 according to the first embodiment in that a plurality of evaluators 260C (260C-1 through 260C-5) are provided between a pitch calculator 220C and a tuning value calculator 230C. The evaluators 260C depicted in FIG. 12 calculate evaluation values for input sounds based on a comparison between the peaks 340, 350, and 360 and the reference pitches 430 corresponding thereto depicted in FIG. 4 or a comparison between the integrated peak 470 and the reference pitch 430L or 430R depicted in FIG. 8, for example.

The evaluators 260C have respective different evaluation criteria. Input sounds are evaluated based on the evaluation criteria by the evaluators 260C, which calculate different evaluation values. A tuning value is then calculated based on the calculated evaluation values. A process of calculating evaluation values and a tuning value will be described in detail below.

Figure 13:
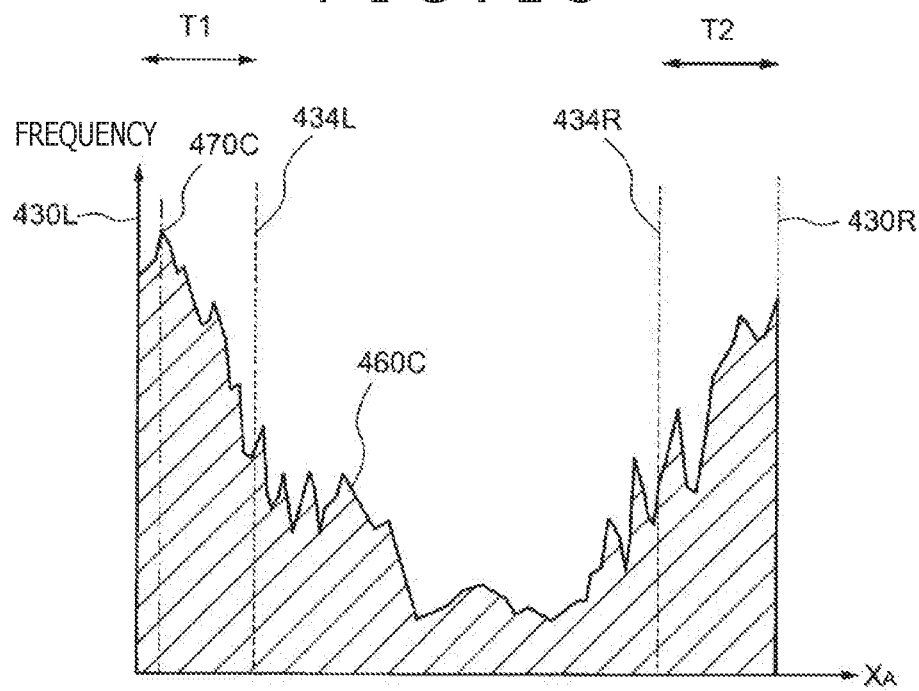
FIG. 13 is a diagram depicting an example of an evaluating process carried out by evaluators in a tuning process according to the embodiment of the present invention.

FIG. 13 is a diagram depicting an example of an evaluating process carried out by the evaluators in a tuning process according to the embodiment of the present invention. The process of calculating evaluation values, which is carried out by the evaluators 260C, will be described below with reference to FIG. 13. FIG. 13 depicts a second distribution 460C similar to that depicted in FIG. 8. In FIG. 13, a first threshold value 434L and a second threshold value 434R are provided at certain positions spaced from the reference pitch 430L and the reference pitch 430R. Evaluation values are determined based on the sum of an integral value of the second distribution 460C in a first evaluation region T1 from the reference pitch 430L to the first threshold value 434L and an integral value of the second distribution 460C in a second evaluation region T2 from the reference pitch 430R to the second threshold value 434R. In other words, the closer the second distribution 460C is to the reference pitches 430L and 430R, the higher the evaluation values.

Figure 14:
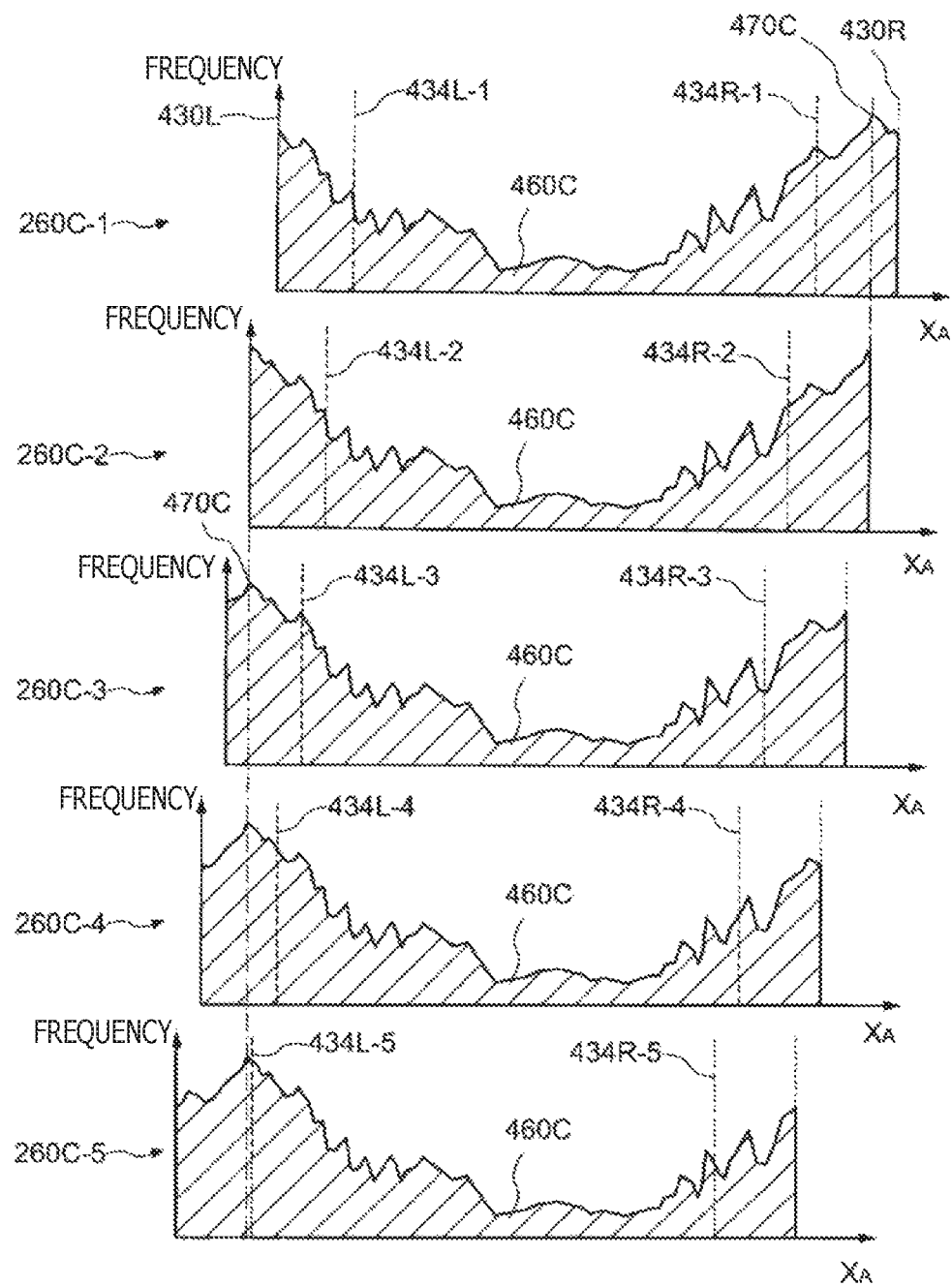
FIG. 14 is a diagram depicting an example of a tuning process based on evaluation values obtained by the evaluators in the tuning process according to the embodiment of the present invention.

FIG. 14 is a diagram depicting an example of a tuning process based on evaluation values obtained by the evaluators in the tuning process according to the embodiment of the present invention. In FIG. 14, the evaluators 260C-1 through 260C-5 have reference pitches 430L and 430R at different positions on the second distribution 460C. In other words, offsets are provided in the respective tuning reference positions of the evaluators. The second distributions 460C depicted in FIG. 14 are identical to the second distribution 460C depicted in FIG. 13. For example, the tuning reference position of the evaluator 260C-3 is 440 Hz, the tuning reference positions of the evaluators 260C-1 and 260C-2 may be shifted +20 cents and +10 cents, respectively, from 440 Hz, and the tuning reference positions of the evaluators 260C-4, 260C-5 may be shifted -10 cents and -20 cents, respectively, from 440 Hz. Stated otherwise, the evaluators 260C can be said to have different tuning values.

Since the evaluators 260C-1 through 260C-5 have their reference pitches 430L at different positions on the second distribution 460C, the relative positional relationships of first threshold values 434L-1 through 434L5 and second threshold values 434R-1 through 434R-5 with respect to the second distribution 460C are different from each other. Therefore, evaluation values calculated with respect to the evaluators 260C-1 through 260C-5 are different from each other. Because an evaluation value is higher as the second peak 470C is closer to the reference pitch 430L or 430R, it is possible to determine an evaluator 260C whose tuning reference position is optimum based on the evaluation value. For example, in FIG. 14, the evaluation value of the evaluator 260C-2 in which the reference pitches 430L and 430R are in essential agreement with the second peak 470 is the highest. Therefore, based on the tuning reference position of the evaluator 260C-2 that has calculated the highest evaluation value, "+10 cents" is calculated as a tuning value. Stated otherwise, the tuning value calculator 230 can be said to calculate a tuning value based on a plurality of evaluation values calculated by the evaluators 260C. In this example, the process of calculating a tuning value based on the tuning reference position of the evaluator 260C-2 whose evaluation value is the highest among the evaluators 260C has been described above. However, the present invention is not limited to such a process, but a tuning value may be calculated based on the tuning reference position of an evaluator 260C that has calculated a predetermined evaluation value. According to another process, a tuning value may be calculated based on the average value of a Gaussian distribution obtained from evaluation values plotted with respect to the evaluators 260C in graphs having horizontal axes representing the tuning reference positions of the evaluators 260C and vertical axes representing the evaluation values calculated by the evaluators 260C.

As described above, since the tuning estimating apparatus according to the fifth embodiment of the present invention is capable of calculating a tuning value based on the evaluation values calculated by the evaluators having different frequency distributions of pitches and different evaluation criteria, the tuning estimating apparatus can calculate tuning information based on input sounds in the absence of a guide melody or information about changed pitches of an instrumental accompaniment. Inasmuch as the above evaluation values reflect a distribution in a certain range, they are less susceptible to abrupt noise or the like.

Sixth Embodiment

According to a sixth embodiment, a tuning estimating apparatus will be described below in which a plurality of evaluators in a limited range calculate evaluation values, so that a highly accurate tuning value can be calculated with a few evaluators. For example, peaks may be narrowed down to a peak to be used to calculate a tuning value, as is the case with the fourth embodiment, evaluation values may be calculated by evaluators 260C whose tuning reference positions are varied in small steps, and a tuning value may be calculated based on the evaluation values. The peaks may be narrowed down using a smoothed distribution as with the fourth embodiment or using a distribution prior to being smoothed.

As described above, since the tuning estimating apparatus according to the sixth embodiment of the present invention is capable of calculating a tuning value based on the evaluation values calculated by the evaluators having different frequency distributions of pitches and different evaluation criteria, the tuning estimating apparatus can calculate tuning information based on input sounds in the absence of a guide melody or information about changed pitches of an instrumental accompaniment. Inasmuch as the evaluation values are calculated with respect to a narrowed-down region, it is possible to calculate a highly accurate tuning value with a few evaluators.

In the fifth embodiment and the sixth embodiment, the first threshold value 434L and the second threshold value 434R may further be subdivided. For example, the first threshold value 434L may be divided into two regions, and an evaluation value with a different weight may be calculated with respect to each of the regions. For example, evaluation values may be calculated such that they are higher as the pitches are closer to the reference pitches 430L and 430R.

The above weights may be added to evaluation values separately on flats and sharps. In other words, different weights may be added respectively to an evaluation value in a first evaluation region T1 and an evaluation value in a second evaluation region T2. For example, evaluation values on sharps which are considered to stand out on auditory sensation may be relatively lowered, thereby matching the evaluation values to the feeling of the listener.

Seventh Embodiment

According to a seventh embodiment, a karaoke apparatus 20 (evaluating apparatus) using either one of the tuning estimating functional unit according to the first through sixth embodiments will be described below. Though the karaoke apparatus will be described in the seventh embodiment, the embodiment is also applicable to a musical instrument performance evaluating apparatus.

[Hardware]

Figure 15:
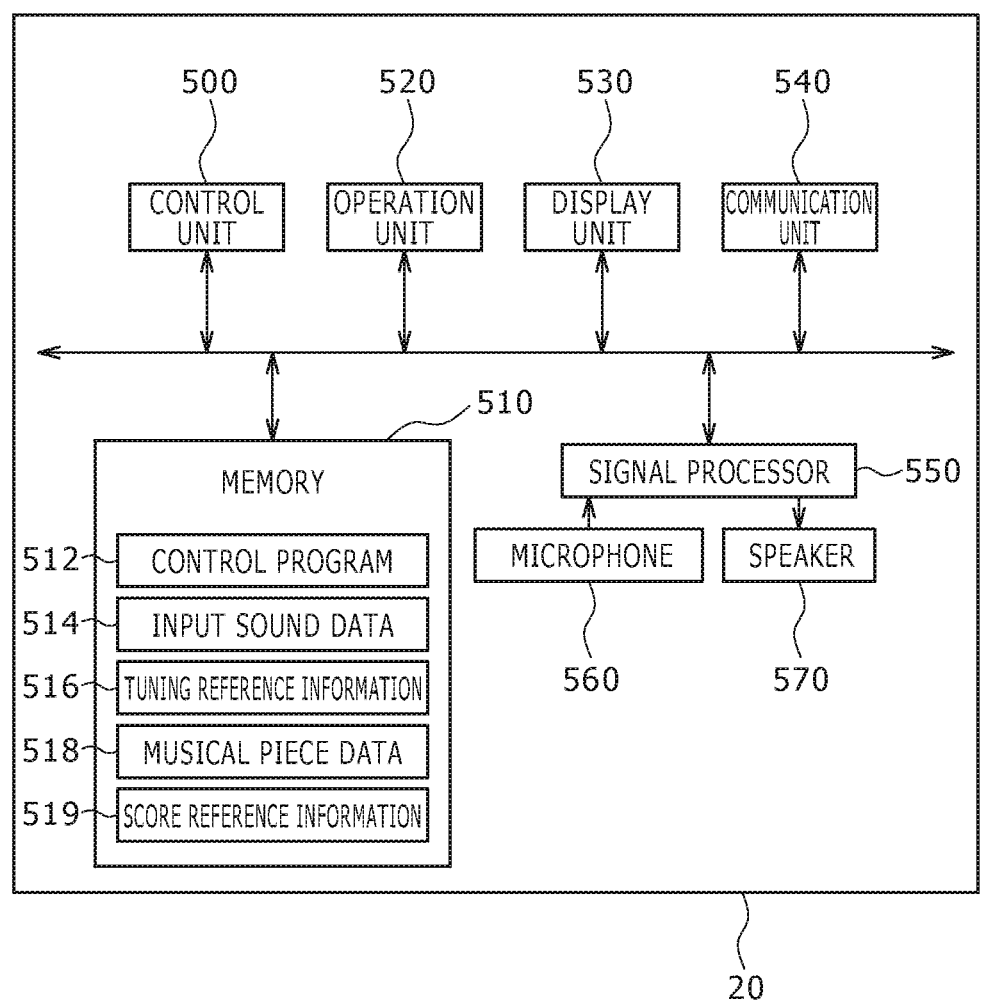
FIG. 15 is a block diagram depicting a hardware configuration of an evaluating apparatus according to an embodiment of the present invention.

FIG. 15 is a block diagram depicting a hardware configuration of a karaoke apparatus according to an embodiment of the present invention. As depicted in FIG. 15, the karaoke apparatus, denoted by 20, is different from the tuning estimating apparatus 10 depicted in FIG. 1 in that a memory 510 stores, in addition to a control program 512, input sound data 514, and tuning reference information 516, musical piece data 518 and score reference information 519, and a speaker 570 is connected to a signal processor 550. The signal processor 550 includes a sound source for generating an audio signal from a MIDI-format signal, a D/A converter, etc.

The musical piece data 518 include data related to musical pieces of karaoke, e.g., guide melody data, accompaniment data, and lyric data. The guide melody data are data representing the melodies of musical pieces. The accompaniment data are data representing the accompaniments of musical pieces. The guide melody data and the accompaniment data may be data presented in the MIDI format. Accompaniment data are read by a control unit 500, converted from digital data into analog data by a signal processor 550, and output as the accompaniment of a musical piece from a speaker 570. At this time, a guide melody may also be output from the speaker 570. The lyric data are data representing the lyrics of musical pieces and data representing the timings of changing colors of displayed on-screen lyrics.

The score reference information 519 is information to be used by an evaluating function as criteria for evaluating singing voices. For example, the score reference information 519 includes information for identifying changes in singing pitches (singing pitch waveform) in order to detect singing techniques. Singing techniques such as vibrato, "kobushi," "shakuri," and fall are represented by the following singing pitch waveforms, for example:

(A) Vibrato: a musical note changing up and down slightly (within a predetermined period) in pitch. A specific example of its singing pitch waveform is indicated by "V" in FIG. 3. A specific example of vibrato detection is disclosed in JP 2005-107087A.

(B) Kobushi: a musical note going up temporarily (within a predetermined time) in pitch and then returning to its original pitch. A specific example of its singing pitch waveform is indicated by "K" in FIG. 3. A specific example of kobushi detection is disclosed in JP 2008-268370A.

(C) Shakuri: a musical note going up over a predetermined time and then becoming stable in pitch. A specific example of its singing pitch waveform is indicated by "S" in FIG. 3. A specific example of shakuri detection is disclosed in JP 2005-107334A.

(D) Fall: a musical note going down over a predetermined time in pitch and then coming to a stop. A specific example of its singing pitch waveform is indicated by "F" in FIG. 3. A specific example of fall detection is disclosed in JP 2008-225115A.

[Functional Unit of Evaluating Apparatus]

Figure 16:
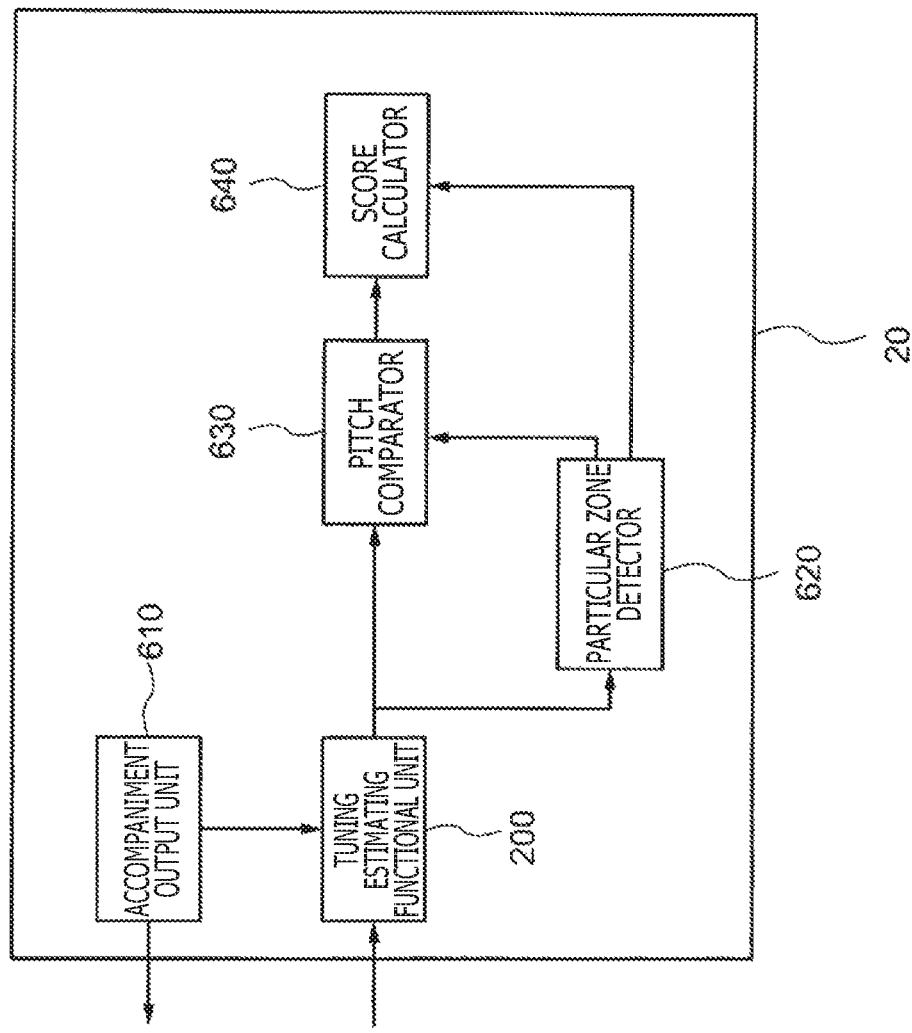
FIG. 16 is a block diagram depicting a functional configuration of the evaluating apparatus according to the embodiment of the present invention.

FIG. 16 is a block diagram depicting a functional configuration of the karaoke apparatus according to the embodiment of the present invention. The karaoke apparatus 20 includes an accompaniment output unit 610, a tuning estimating functional unit 200, a particular zone detector 620, a pitch comparator 630, and a score calculator 640. The accompaniment output unit 610 reads accompaniment data corresponding to a musical piece designated by the singer, and outputs accompaniment sounds through the signal processor 550 from the speaker 570. The tuning estimating functional unit 200 described above in the first through sixth embodiments may be used as the tuning estimating functional unit 200. The tuning estimating functional unit 200 outputs reference pitches, pitches calculated by the pitch calculator 220, and a tuning value calculated by the tuning value calculator 230 and sends them to the pitch comparator 630. The tuning estimating functional unit 200 may output pitches corrected by a calculated tuning value. The particular zone detector 620 analyzes a singing pitch waveform and detects zones (particular zones) including singing techniques defined by score reference information from an input period of singing voices. The particular zones detected at this time may be associated with respective types of singing techniques.

The pitch comparator 630 sets a zone in the input period of singing voices, except the particular zones detected by the particular zone detector 620, as an evaluation zone. The pitch comparator 630 compares the singing pitches and the reference pitches with each other based on the singing pitch waveform in the evaluation zone, the reference pitches, and the tuning value calculated by the tuning estimating functional unit 200. The singing pitches may be adjusted using the tuning value, or conversely the reference pitches may be adjusted. The singing pitches or the reference pitches may be adjusted after the musical pitch has finished or may be adjusted in real time while the singer is singing. In this example, a degree of mismatch between the singing pitch waveform and the reference pitches is calculated as the result of comparison. Here, a plurality of reference pitches are present at intervals of 100 cents. Of the reference pitches, a reference pitch that is closest to a singing pitch is selected as a target to be compared with the singing pitch. As the difference between the singing pitch waveform and the reference pitches is larger, a higher degree of mismatch is calculated. For example, the differences between the singing pitches of respective samples in the singing pitch waveform and the reference pitches are added up in the evaluation zone, and the sum value is divided by the number of the samples in the evaluation zone, thereby calculating a degree of mismatch.

In this manner, the singing can be evaluated independently of the melody. In this example, the singing pitches and the reference pitches are compared with each other in a zone except particular zones, rather than the entire input period of singing voices. Therefore, it is possible for an intentional deviation of singing pitches according to singing techniques in the particular zones not to increase a degree of mismatch. The evaluation zone may be divided into a plurality zones, and a degree of mismatch may be calculated in each of the divided zones. The divided zones may have respective zones each partly overlapping another.

The score calculator 640 calculates a score value serving as an indicator of an evaluation of the singing voices based on the result of comparison in the pitch comparator 630. In this example, as the degree of mismatch calculated by the pitch comparator 630 is higher, a lower score value is calculated, resulting in a poorer evaluation of the singing voices. The score calculator 640 may not calculate a score value based on only a degree of mismatch, but may calculate a score value based on other elements. The other elements may include another parameter that can be extracted from singing techniques and singing voice data. If singing techniques are to be reflected in a score value, then a score value may be calculated using singing techniques corresponding particular zones detected by the particular zone detector 620. The other parameter may be a change in sound volume, for example. Using a change in sound volume, it is possible to add singing intonation to an evaluation. A result of evaluation produced by the score calculator 640 may be presented on a display unit 530.

As described above, since the karaoke apparatus according to the seventh embodiment of the present invention is capable of calculating a tuning value based on a peak group in a frequency distribution of pitches, the karaoke apparatus can calculate tuning information based on input sounds in the absence of a guide melody or information about changed pitches of an instrumental accompaniment.

In the seventh embodiment, a degree of mismatch is calculated by the pitch comparator 630 by adding up the differences between the reference pitches and the singing pitches in the respective samples. As the differences are larger, they may be weighted in order to produce a larger degree of mismatch. For example, in case the differences between reference pitches and singing pitches are 10 cents and 20 cents, the difference between score values may be three times, rather than twice. Conversely, in case the differences between reference pitches and singing pitches are smaller than a predetermined range (e.g., 2 cents or smaller), they may be handled as matching each other (the difference is 0 cent), thereby not increasing the degree of mismatch.

The differences between the reference pitches and the singing pitches may be added up separately for flats and sharps, and a degree of mismatch for flats and a degree of mismatch for sharps may be calculated separately. In the event that a degree of mismatch is larger for either flats or sharps, it may be determined whether the singing is shifted toward sharps or flats.

Eighth Embodiment

According to an eighth embodiment, a data processing apparatus that uses either one of the tuning estimating functional unit according to the first through sixth embodiments will be described below. According to the eighth embodiment, a data processing method in which the data processing apparatus corrects and synthesizes singing data with respect to a tuned musical accompaniment will be described below. Hardware will not be described below as it may be identical to that depicted in FIG. 1.

[Functional Unit of Data Processing Apparatus]

Figure 17:
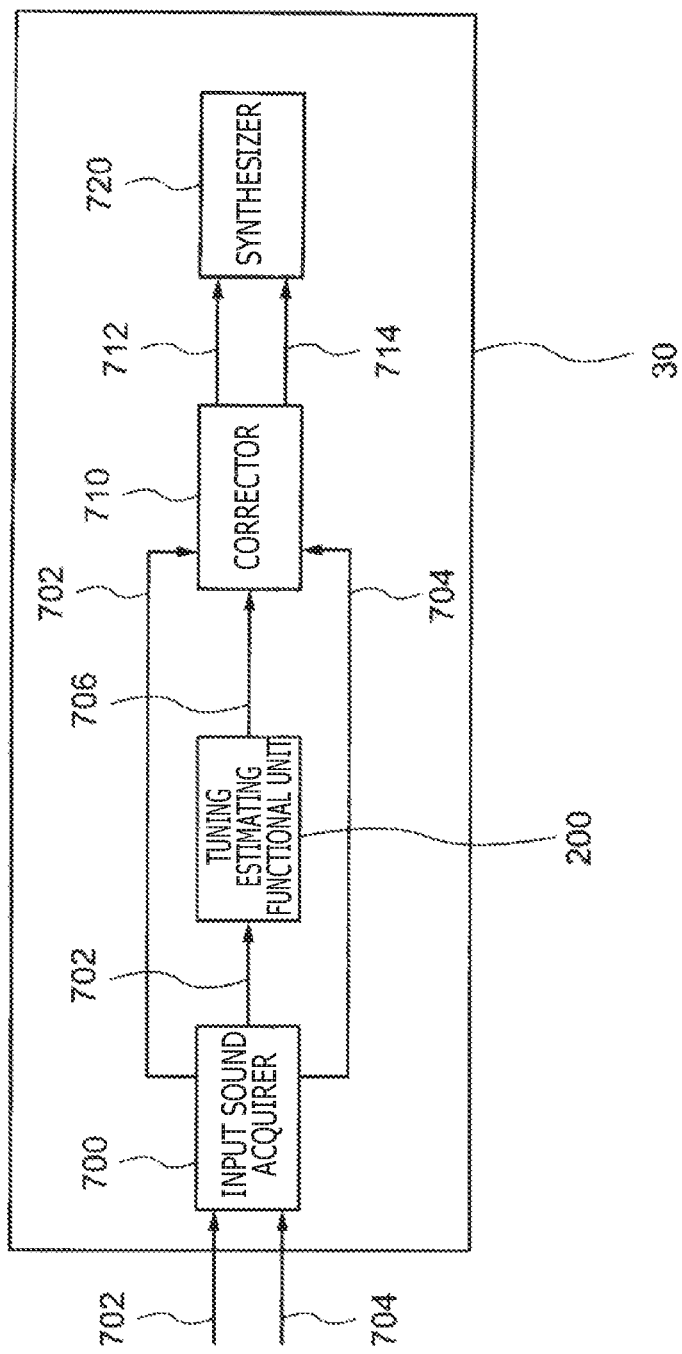
FIG. 17 is a block diagram depicting a functional configuration of a data processing apparatus according to an embodiment of the present invention.

FIG. 17 is a block diagram depicting a functional configuration of a data processing apparatus according to an embodiment of the present invention. The data processing apparatus, denoted by 30, includes a tuning estimating functional unit 200, an input sound acquirer 700, a corrector 710, and a synthesizer 720. The tuning estimating functional unit 200 described above in the first through sixth embodiments may be used as the tuning estimating functional unit 200. In the data processing apparatus 30, the input sound acquirer 700 acquires two input sounds, i.e., a first input sound 702 and a second input sound 704. Of these input sounds, the first input sound 702 is sent to the tuning estimating functional unit 200, which calculates a tuning value 706 based on the first input sound 702. The corrector 710 corrects the relationship between the first input sound 702 and the second input sound 704 based on the tuning value 706 calculated by the tuning estimating functional unit 200, the first input sound 702, and the second input sound 704. The synthesizer 720 synthesizes a first input sound 712 and a second input sound 714 that have been corrected by the corrector 710.

A specific example in which singing data is synthesized with a tuned musical accompaniment will be described below. First, the input sound acquirer 210 included in the tuning estimating functional unit 200 acquires singing data. Then, the pitch calculator 220 calculates singing pitches with respect to the singing data. Then, the tuning value calculator 230 calculates a singing data tuning value based on the distribution of the singing pitches. Then, the corrector 710 corrects the singing data based on the singing data tuning value. The synthesizer 720 then synthesizes the corrected singing data and accompaniment data.

As described above, the data processing apparatus according to the eighth embodiment of the present invention does not need extra operation of the user as it can automatically correct acquired singing data and synthesize the corrected singing data with accompaniment data based on a tuning value calculated from the acquired singing data.

Ninth Embodiment

According to a ninth embodiment, a data processing apparatus that uses either one of the tuning estimating apparatus according to the first through sixth embodiments will be described below. According to the ninth embodiment, a data processing method in which the data processing apparatus corrects and synthesizes playing data from a musical instrument and singing data will be described below. Hardware used in the ninth embodiment will not be described below as it may be identical to that depicted in FIG. 1. Functional blocks that a data processing functional unit has are identical to those depicted in FIG. 17, but have different functions. Operation of the data processing apparatus according to the ninth embodiment will be described below as to its functions with reference to FIG. 18.

[Functional Unit of Data Processing Apparatus]

Figure 18:
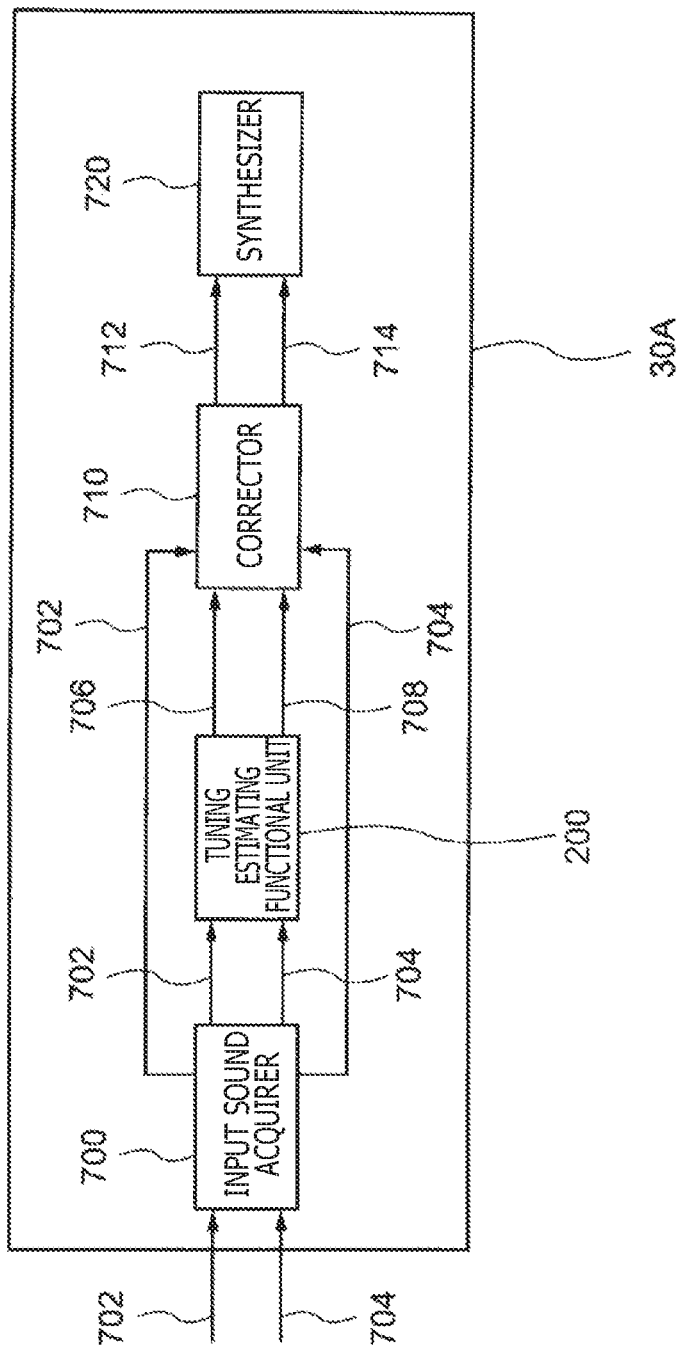
FIG. 18 is a block diagram depicting a functional configuration of a data processing apparatus according to an embodiment of the present invention.

FIG. 18 is a block diagram depicting a functional configuration of a data processing apparatus according to an embodiment of the present invention. The data processing apparatus, denoted by 30A, includes a tuning estimating functional unit 200, an input sound acquirer 700, a corrector 710, and a synthesizer 720, as with the data processing apparatus 30. The tuning estimating functional unit 200 described above in the first through sixth embodiment may be used as the tuning estimating functional unit 200. In the data processing apparatus 30A, the input sound acquirer 700 acquires two input sounds, i.e., a first input sound 702 and a second input sound 704. The first input sound 702 and the second input sound 704 are sent to the tuning estimating functional unit 200, which calculates a first tuning value 706 based on the first input sound 702 and a second tuning value 708 based on the second input sound 704. The corrector 710 corrects the relationship between the first input sound 702 and the second input sound 704 based on the first input sound 702, the second input sound 704, and the first tuning value 706 and the second tuning value 708 that have been calculated by the tuning estimating functional unit 200. The synthesizer 720 synthesizes a first input sound 712 and a second input sound 714 that have been corrected by the corrector 710.

A specific example in which playing data from a played musical instrument and singing data are synthesized with each other will be described below. First, the input sound acquirer 210 acquires playing data and singing data. Then, the pitch calculator 220 calculates playing pitches with respect to the playing data and singing pitches with respect to the singing data. Then, the tuning value calculator 230 calculates a playing data tuning value based on the distribution of playing pitches and calculates a singing data tuning value based on the distribution of the singing pitches. Then, the corrector 710 corrects the playing data based on the playing data tuning value and corrects the singing data based on the singing data tuning value. The synthesizer 720 then synthesizes the corrected playing data singing data and the corrected playing data.

As described above, the data processing apparatus according to the ninth embodiment of the present invention does not need extra operation of the user as it can automatically correct acquired playing data and acquired singing data and synthesize the corrected playing data and singing data with each other based on respective tuning values calculated from the acquired playing data and the acquired singing data.

Tenth Embodiment

According to a tenth embodiment, a tuning estimating apparatus for calculating a tuning value according to a process different from the first through sixth embodiments will be described below. According to the tenth embodiment, a tuning value estimating method for calculating a deviation (tuning value) from a pitch that serves as a reference to pitches will be described below. Hardware used in the tenth embodiment will not be described below as it may be identical to that according to the first embodiment. Functional blocks that the tuning value estimating apparatus has are identical to those depicted in FIG. 2, but have different functions. Operation of the tuning value estimating apparatus according to the tenth embodiment will be described below as to its functions with reference to FIG. 2.

[Tuning Estimating Functional Unit]

In a tuning estimating functional unit 200D of a tuning estimating apparatus 10D according to the tenth embodiment, an input sound acquirer 210D acquires input sounds. A pitch calculator 220D calculates pitches of the input sounds acquired by the input sound acquirer 210D. A tuning value calculator 230D calculates, at the respective pitches, tuning values for peaks of a distribution where the pitches calculated by the pitch calculator 220D are integrated.

Operation of the tuning estimating apparatus 10D will specifically be described below using the distribution depicted in FIG. 5. In the first embodiment, the process of calculating a tuning value for the first distribution 400 in its entirety based on the differences between some or all of the peaks 340, 350, and 360 of the first distribution 400 and the reference pitches 430 established in the vicinities thereof has been described. According to the tenth embodiment, tuning values are individually calculated for the respective pitches of the first distribution 400 where the pitches are integrated. Specifically, a tuning value is calculated for the peak 340 based on the offset 436 between the peak 340 and the reference pitch 430 in the vicinity thereof. Similarly, a tuning value is calculated for the peach 350 based on the offset 436 between the peak 350 and the reference pitch 430 in the vicinity thereof. In this manner, tuning values may be individually calculated for the respective pitches.

As described above, the tuning estimating apparatus according to the tenth embodiment of the present invention is capable of detecting a deviation of a tuning value for a particular pitch as it can calculate tuning values for respective pitches based on a plurality of peaks in a frequency distribution of pitches.

Eleventh Embodiment

According to an eleventh embodiment, a tuning estimating apparatus for calculating a tuning value according to a process different from the first embodiment will be described below. In the first embodiment, the tuning process for calculating a tuning value based on deviations between the peaks 340, 350, 306 of the first distribution 400 and the reference pitches 430 has been described above. According to the eleventh embodiment, a tuning process for calculating a tuning value based on a deviation between one (e.g., the peak 350) of the peaks 340, 350, 306 of the first distribution 400 and a referenced pitch 430 (e.g., the tuning reference position 432) will be described below.

The tuning process according to the eleventh embodiment will be described below with reference to FIG. 5. The tuning estimating apparatus according to the eleventh embodiment calculates a tuning value based on only a deviation between the tuning reference position 432 and the peak 350 that corresponds to the tuning reference position on the first distribution 400. In other words, a tuning value is calculated based on only a deviation between the tuning reference position 432 and the peak 350, without taking into account a deviation between the peak 340 and the reference pitch 430 at a position corresponding thereto and a deviation between the peak 360 and the reference pitch 430 at a position corresponding thereto. However, a reference pitch 430 and a peak of the first distribution 400 that are used to calculate a tuning value may be selected appropriately, and are not limited to the tuning reference position 432 and the peak 350 as described above. A plurality of peaks may not be present on the first distribution 400. Tuning values corresponding to the peaks 340, 350, and 360 may be calculated based on deviations between the peaks 340, 350, and 360 and reference pitches 430 corresponding respectively to those peaks. In other words, tuning values may be calculated for a plurality of pitches from the first distribution 400.

The tuning estimating apparatus according to the eleventh embodiment of the present invention can be used in tuning musical instruments as it can calculate a tuning value for a particular pitch, as described above. Since the tuning estimating apparatus can simultaneously calculate tuning values for a plurality of pitches, respectively, it can shorten the time required to tune musical instruments.

Other Embodiments

Sounds represented by singing voice data acquired by the input sound acquirer 210 are not limited to voice sounds from a singer, but voice sounds from a synthesis of singing voices, or musical instrument sounds. If the sounds are musical instrument sounds, they should preferably be generated by monotone performance. If the sounds are musical instrument sounds, techniques detected as particular zones include, for example, vibrato, staccato, bend-up (shakuri), bend-down (fall), and slide (portamento). Of these techniques, vibrato, bend-up, bend-down, and slide that are accompanied by pitch changes are detected in the same processes as with the embodiments. Since these techniques affect pitches calculated by the pitch calculator 220, they are excluded from an evaluation in the evaluation zone in the same manner as singing in the particular zones thus detected. Besides, musical notes such as trills and very short ornamental sounds, and techniques about tones such as saxophone growling, guitar cutting, etc. may also be detected as particular zones and excluded from an evaluation as they affect the accuracy with which to acquire pitches. Furthermore, with respect to musical instruments capable of producing compound sounds, produced compound sounds may be detected and removed for the prevention of malfunctions.

REFERENCE SIGNS LIST

10: Tuning estimating apparatus, 20: Karaoke apparatus, 30: Data processing apparatus, 100, 500: Control unit, 110, 510: Memory, 112: Control program, 114: Singing voice data, 116: Tuning reference information, 120: Operation unit, 130, 530: Display unit, 140: Communication unit, 150, 550: Signal processor, 160: Microphone, 20: Karaoke apparatus, 200: Tuning estimating functional unit, 210, 700: Input sound acquirer, 220: Pitch calculator, 230: Tuning value calculator, 240: Pitch converter, 250: Pitch smoothing processor, 260: Evaluator, 300: Singing pitch waveform, 310, 410: Vertical axis, 320, 420: Horizontal axis, 330, 430: Reference pitch, 340, 350, and 360: First peak, 400: First distribution, 432: Tuning reference position, 434L: First threshold value, 434R: Second threshold value, 450: Second distribution, 460: Integrated second distribution, 462: Noise peak, 470: Second peak, 480: Third distribution, 490: Third peak, 518: Musical piece data, 519: Score reference information, 570: Speaker, 610: Accompaniment output unit, 620: Particular zone detector, 630: Pitch comparator, 640: Score calculator, 710: Corrector, 720: Synthesizer

The invention claimed is:

1. A tuning estimating apparatus, comprising:
a first input sound acquirer configured to acquire input sounds;
a pitch calculator configured to calculate pitches of the acquired input sounds; and
a tuning value calculator configured to calculate a tuning value based on a positional relationship of a peak group that has periodicity, wherein
the tuning value represents an offset between a tuning reference position serving as a reference for tuning and a reference position on a first distribution of the calculated pitches, and
the peak group includes a plurality of peaks of the first distribution.

2. The tuning estimating apparatus according to claim 1, wherein the tuning value calculator is further configured to calculate the tuning value based on deviations between the peak group and a plurality of reference pitches including the tuning reference position.

3. The tuning estimating apparatus according to claim 1, further comprising:
a pitch converter configured to:
divide the first distribution into a plurality of distributions starting from reference points disposed at constant periods; and
calculate a second distribution by integrating the divided plurality of distributions,
wherein the tuning value calculator is further configured to calculate the tuning value based on peaks of the second distribution integrated by said pitch converter.

4. The tuning estimating apparatus according to claim 3, wherein intervals between respective lengths of the plurality of distributions are equal to intervals between adjacent ones of a plurality of reference pitches including the tuning reference position.

5. The tuning estimating apparatus according to claim 3, further comprising:
a pitch smoothing processor configured to calculate a third distribution by smoothing the second distribution, wherein
the tuning value calculator is further configured to search the third distribution for peaks of the third distribution, and
the peaks of the second distribution are determined based on the peaks of the third distribution.

6. An evaluating apparatus, comprising:
the tuning estimating apparatus according to claim 1;
a pitch comparator configured to compare, in a predetermined evaluation zone, the calculated pitches and reference pitches based on the calculated pitches, the reference pitches, and the calculated tuning value; and
a score calculator configured to calculate a score value with respect to the acquired input sounds based on a result of the comparison.

7. A data processing apparatus, comprising:
the tuning estimating apparatus according to claim 1;
a second input sound acquirer configured to acquire a first input sound and a second input sound;
a corrector configured to correct a relationship between the first input sound and the second input sound based on the first input sound, the second input sound, and the calculated tuning value; and
a synthesizer configured to synthesize the first input sound and the second input sound corrected by the corrector,
wherein the tuning value calculator is further configured to calculate the tuning value based on the first input sound.

8. A tuning estimating apparatus, comprising:
a first input sound acquirer configured to acquire input sounds;
a pitch calculator configured to calculate pitches of the acquired input sounds;
a plurality of evaluators configured to calculate evaluation values with respect to the acquired input sounds based on comparison with reference pitches at tuning reference positions serving as references for tuning,
wherein the tuning reference positions of the plurality of evaluators are different from each other; and
a tuning value calculator configured to calculate a tuning value based on a tuning reference position of a specific evaluator of the plurality of evaluators and a positional relationship of a peak group that has periodicity,
wherein the peak group includes a plurality of peaks of a distribution of the calculated pitches.

9. A tuning estimating apparatus, comprising:
an input sound acquirer configured to acquire input sounds;
a pitch calculator configured to calculate pitches of the acquired input sounds; and
a tuning value calculator configured to calculate tuning values for the calculated pitches, wherein
the tuning values represent offsets between a plurality of peaks of a distribution of the calculated pitches and respective references established for the calculated pitches,
the tuning values are calculated based on a positional relationship of a peak group that has periodicity, and
the peak group includes the plurality of peaks of the distribution of the calculated pitches.

* * * * *